US 6,675,568 B2

(12) United States Patent
Patterson et al.

(10) Patent No.: US 6,675,568 B2
(45) Date of Patent: Jan. 13, 2004

(54) MULTI-SECTION HEADER WITH FLEXIBLE CROP CUTTING KNIFE

(75) Inventors: Roger L. Patterson, Selkirk (CA); Francois R. Talbot, Winnipeg (CA)

(73) Assignee: MacDon Industries Ltd., Winnipeg (CA)

( * ) Notice: Subject to any disclaimer, the term of this patent is extended or adjusted under 35 U.S.C. 154(b) by 2 days.

(21) Appl. No.: 10/159,981

(22) Filed: Jun. 3, 2002

(65) Prior Publication Data

US 2003/0074876 A1 Apr. 24, 2003

Related U.S. Application Data

(60) Provisional application No. 60/298,385, filed on Jun. 18, 2001, and provisional application No. 60/342,134, filed on Dec. 26, 2001.

(51) Int. Cl.[7] .......................... A01D 67/00; A01B 73/00
(52) U.S. Cl. ........................................... 56/208; 56/228
(58) Field of Search ............................ 56/51, 208, 210, 56/219, 220, 221, 228

(56) References Cited

U.S. PATENT DOCUMENTS

| | | | | |
|---|---|---|---|---|
| 2,915,870 A | * | 12/1959 | Hume | 56/208 |
| 3,345,808 A | * | 10/1967 | Van Der Lely | 56/208 |
| 3,468,107 A | * | 9/1969 | Van Der Lely | 56/11.9 |
| 4,409,780 A | | 10/1983 | Beougher et al. | |
| 4,446,683 A | | 5/1984 | Rempel et al. | |
| 4,487,004 A | * | 12/1984 | Kejr | 56/208 |
| 4,665,685 A | | 5/1987 | Rupprecht | |
| 4,875,331 A | | 10/1989 | Ostrup et al. | |
| 4,956,966 A | | 9/1990 | Patterson | |
| 5,464,371 A | | 11/1995 | Honey | |
| 5,673,543 A | * | 10/1997 | Richardson et al. | 56/228 |
| 5,911,625 A | * | 6/1999 | von Allworden | 460/119 |

FOREIGN PATENT DOCUMENTS

| | | | |
|---|---|---|---|
| DE | 3906456 | * | 9/1990 |
| FR | 2685162 A1 | * | 6/1993 |

* cited by examiner

Primary Examiner—Robert E. Pezzuto
Assistant Examiner—Nathan Mammen
(74) Attorney, Agent, or Firm—Adrian D. Battison; Michael R. Williams; Ryan W. Dupuis

(57) ABSTRACT

A crop harvesting header for mounting on a propulsion vehicle such as a swather tractor or combine harvester includes a main frame structure supporting a crop receiving table with a cutter bar across a front of the table and side drapers on the table for moving the cut crop toward a discharge location of the header. The frame is divided into a central frame portion and two separate wing frame portions each arranged for pivotal movement relative to the central portion about a pivot axis extending in a plane parallel to the forward direction and intersecting the cutter bar so that, as the wing frame portions pivot, the cutter bar flexes in the area adjacent the respective pivot axis over a small angle of the order of 4 degrees to maintain the cutter bar following the ground. The central frame portion is mounted on two spring arms for upward and twisting floating movement such that the total downward force on the ground, from that part of the weight of all of the portions of the header which is unsupported, can be varied by moving the support to change the total pressure of the header on the ground. The wing frame portions are connected to the central frame portion by interconnecting linkages which transfer weight from the wing frame portions to the springs of the central portion each including a respective balance beam arranged to balance the lifting force from the spring with the downward forces from the center portion and wing frame portion such that the downward force on a skid plate of each portion on the ground varies automatically as the total downward force is varied. A bottom stop is arranged with a balance system which holds the cutter bar straight when the header is raised.

69 Claims, 17 Drawing Sheets

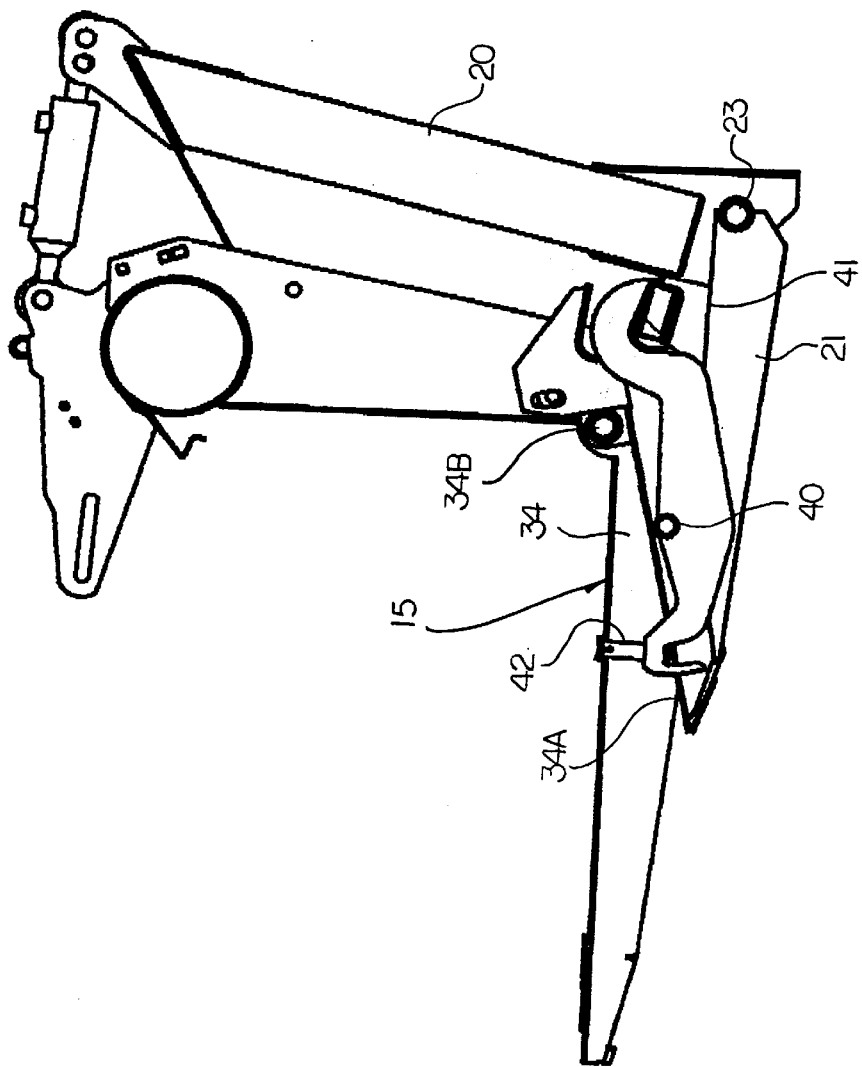

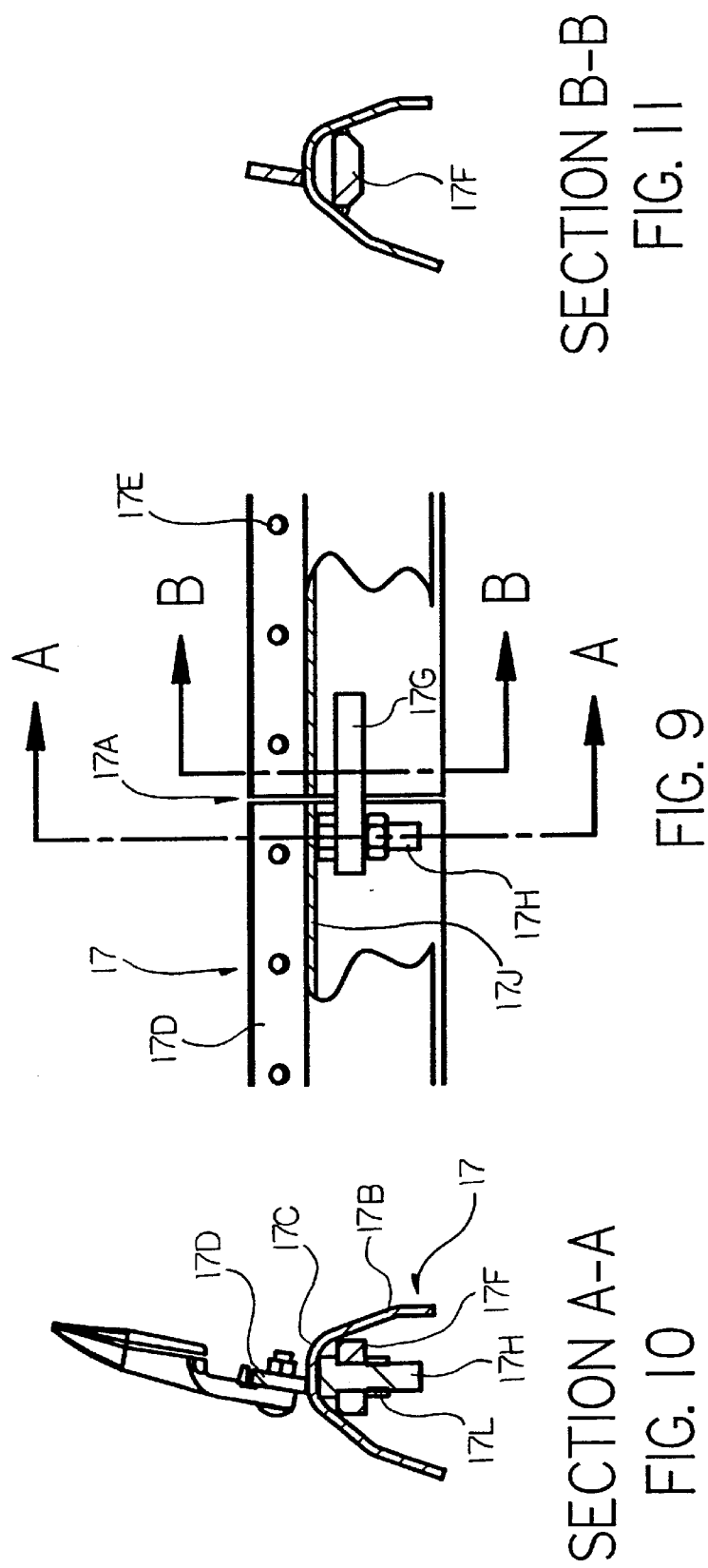

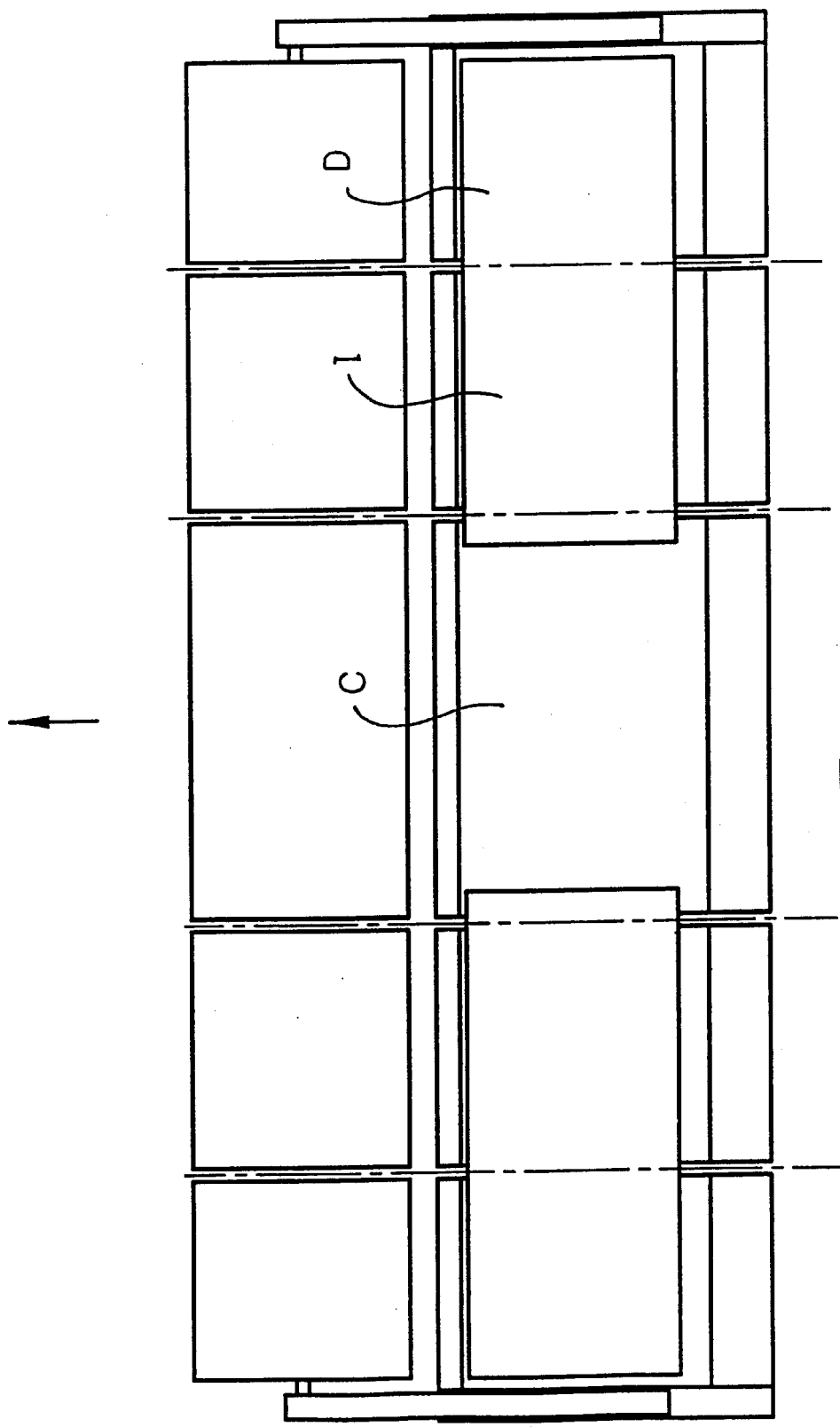

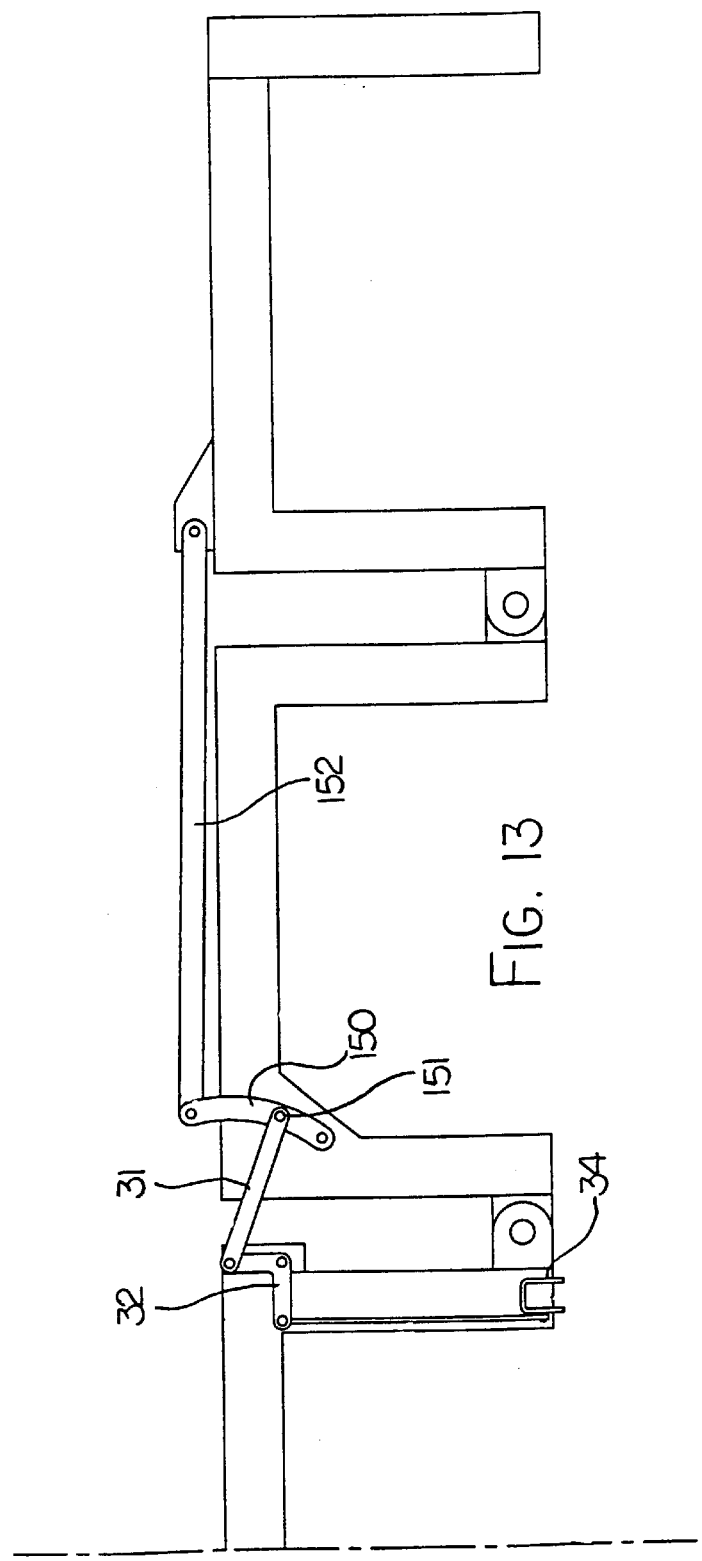

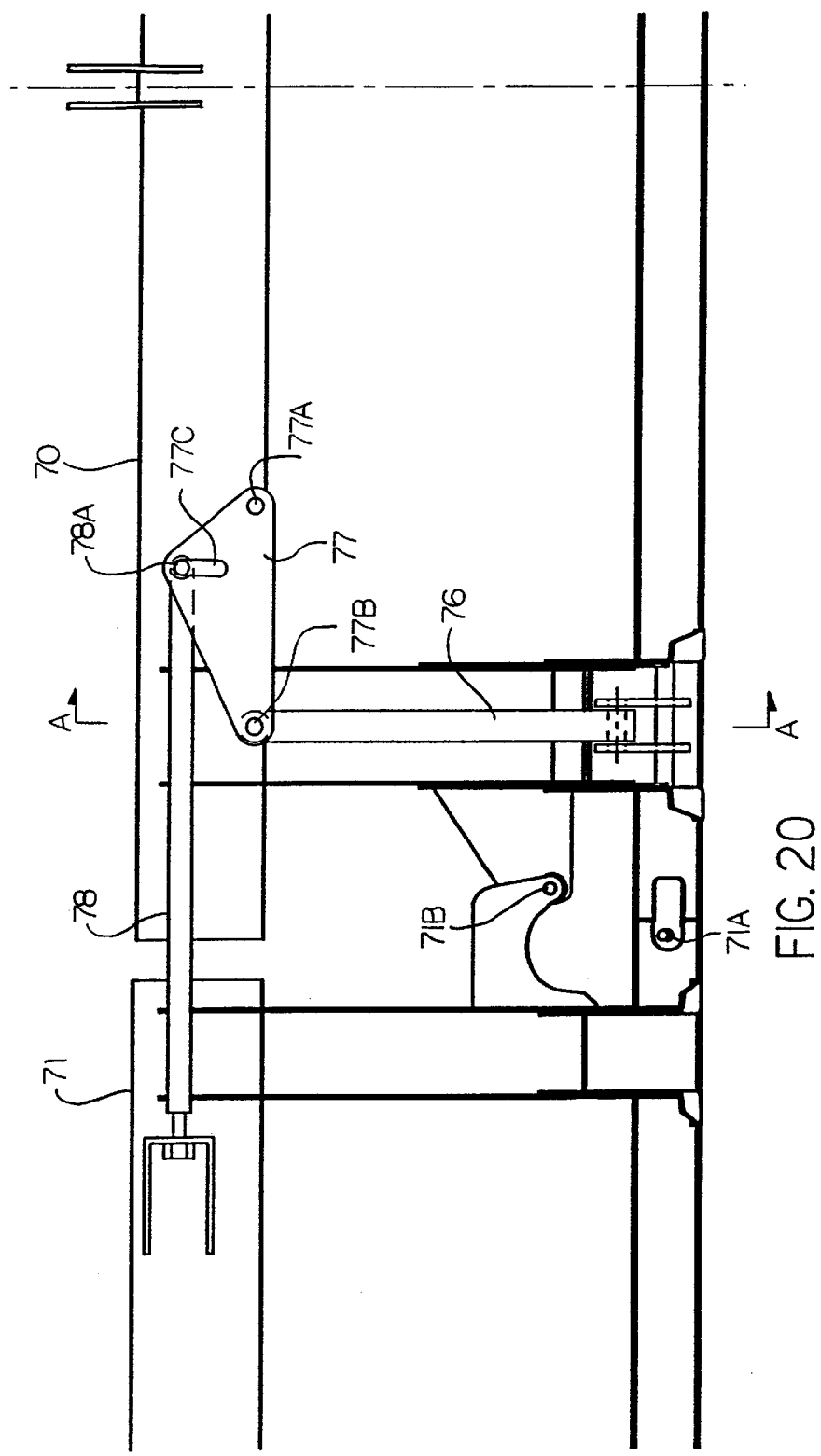

MULTI-SECTION HEADER WITH FLEXIBLE CROP CUTTING KNIFE

This application claims priority under 35USC119 from Provisional Application Ser. No. 60/298,385 filed Jun. 18, 2001 and from Provisional Application Ser. No. 60/342,134 filed Dec. 26, 2001.

This invention relates to header of a crop cutting apparatus such as a swather or a combine harvester which includes a flexible cutting knife.

BACKGROUND OF THE INVENTION

Headers for a crop harvesting machine generally comprises a main longitudinal support member in the form of an elongate tube which extends across substantially the full width of the header frame and defines a main structural member for the header frame. The tube carries a plurality of forwardly and downwardly extending support beams which include a first portion extending downwardly and a second portion attached to a lower end of the first portion and extending forwardly therefrom toward a forward end of the support beams. The cutter bar is attached to the forward end of the support beams and is thus held thereby in a position generally parallel to the main support tube.

Many headers are of a type in which the cutter bar is intended to be in a fixed rigid position relative to the main support tube so that the cutter bar is not intended to flex or float relative to the main structural tube in response to changes in ground contour.

This rigid type of header has the advantage that it allows more accurate control of the position of the fingers or bats of the reel relative to the cutter bar so as to more accurately control the crop as it is swept onto the cutter bar and the table rearwardly of the cutter bar.

In this rigid header type, therefore, the support beams extending forwardly from the main structural tube are substantially rigid and hold the cutter bar in fixed position.

Alternative types of header mount the cutter bar for floating or flexing movement relative to the main structural support tube. This type of header is used to provide an improved action in following the contour of the ground and is advantageous in some circumstances. Thus when cutting crops right at the ground it is desirable that the cutter bar of larger headers, greater than of the order of 20 feet, is somewhat flexible to follow the ground contour. This type of header however has the disadvantage that the flexing or floating of the cutter bar relative to the main support tube causes movement of the cutter bar relative to the bats or fingers of the reel so that it is no longer possible to maintain a close tolerance between the bats or fingers and the cutter bar.

Various manufacturers provide a flexing cutter bar structure for example the Soybean Header manufactured by Case IH under the Model No 820 or 1020.

Another type of header provide a cutter bar which is relatively rigid but can float upwardly and downwardly relative to the main structural support tube of the header. This type of header again is used to allow close floating action of the cutter bar on the ground surface and one example is shown in the "Dial-a-matic Header Height Control" available for various Deere and Company combine harvesters. This floating action of a cutter bar however occurs relative to the main structural tube and therefore relative to the reel so that the cutter bar to reel co-operation cannot be optimized.

It is known that rigid headers are conventionally flexibly mounted to the propulsion machine, that is a swather tractor, combine harvester or pull type frame, and the header as one piece can generally follow the ground contour while the cutting knife remains rigid.

It is also known that headers of this type can be controlled so that they rotate around an axis at a centre of the header in response to sensors which detect ground height so as to maintain the sides of the header as close to the ground as possible.

When cutting above the ground, a header of this type with a rigid knife structure is most effective because the rigid knife structure allows maximum cutting speed and thus an improved cutting action.

When cutting on the ground with larger headers, it is known to have a cutter bar which is mounted on the header so that it can flex or float across its width relative to the ground. Examples of such flexible cutter bars are shown in U.S. Pat. No. 4,665,685 (Rupprecht) issued May 19, 1987 and U.S. Pat. No. 4,875,331 (Ostrup) issued Oct. 24, 1989. Both of these arrangements show a cutter bar which is mounted on a skid and thus skids across the ground and flexes across its whole width to accommodate changes in height of the ground. One disadvantage of the conventional flexible cutter bar is that it may in some designs require a significantly reduced cutting speed since the reciprocation of the conventional sickle knife must be reduced in velocity to accommodate the curvature of the cutter blade which can occur when the whole of the cutter blade is flexible. Conventionally a flexible cutter bar of this type can flex as much as a total of five to six inches to accommodate the changes in ground height which occur relative to the fixed part of the header frame which remains fixed and does not change relative to ground height.

A further disadvantage of a flexible cutter bar of this type is that it is necessary to set the reel at a height which accommodates the upward movement of the cutter bar which can occur. The reel fingers therefore must necessarily be spaced a significant distance from the cutter bar to avoid the possibility that the raised cutter bar interferes with the fingers and causes damage to either or both. This increased distance between the fingers of the reel and the cutter bar can cause irregular or improper feed of the crop material over the cutter bar particularly in light crop conditions so that an accumulation of cut crop on the cutter bar can eventually halt further cutting action leaving a part of the crop uncut and thus unharvested.

The disadvantage of the rigid cutter bar design is that rather than floating over a small area like a ridge or gopher mound, the rigid header pushes dirt in front of the sickle knife which impedes cutting and allows dirt to enter the header with the crop.

Up till now, therefore, the rigid header arrangement with its accurate reel finger to cutter bar location is not fully satisfactory as it cannot accurately follow ground contour; and the flexible cutter bar design, which can follow ground contour, is also not fully satisfactory in view of the increased and varying space between the reel fingers and the cutter bar.

In U.S. Pat. No. 4,956,966 (Patterson) issued September 1990 and assigned to the present Assignee is disclosed a header which includes drapers for transporting the crop inwardly from the sides of the header toward the central discharge section. The use of drapers can provide an arrangement which allows the header table to flex although the arrangement shown in the patent and the product manufactured in accordance with the patent provides a rigid header of the type described above. The header of Patterson includes a central link by which the position of the upper end of the header can be pulled toward or released from the supporting vehicle so as to change the angle of the frame of the header about an axis across the width of the header. A skid plate can be provided just behind the cutter bar which can run across the ground so that the change in angle of the header changes the angle of the cutter bar in front of the skid plate.

In U.S. Pat. No. 5,464,371 (Honey) issued November 1995 to Honeybee Manufacturing is disclosed a draper header of a type similar to that disclosed in Patterson.

In U.S. Pat. No. 4,446,683 (Remple) issued May 1984 to Canadian Cooperative Implements is disclosed a header for a swather which includes a central section and two wing sections in which the wing sections can pivot about a forwardly extending axis to allow the outer ends of the wing sections to be raised to a height as much as six feet from the ground. The cutter bar is continuous through the pivot axes so that the cutter bar flexes as the hinging action occurs. The patent led to development of a product manufactured by the above company which utilized the arrangement of the wing sections and the flexible cutter bar. There were a significant number sold but it is not being built any more and the arrangement is no longer commercial. The device supported the center section on the swather tractor but the wing sections were supported upon individual ground wheels mounted at the ends of the wing sections. It is necessary therefore to control the height of the wing sections by actuating movement of the ground wheels and this arrangement therefore did not allow the system to accurately follow the ground contour.

In U.S. Pat. No. 4,409,780 (Beogher) issued October 1983 to Kansas State University is disclosed a header with three independent sections so that two wing sections can be folded rearwardly for transport. However this arrangement does not provide a flexible arrangement which allows the cutter bar as a whole to accurately follow the ground contour.

In U.S. application Ser. No. 09/562,854 filed May 1, 2000 is disclosed an alternative arrangement for a header with a flexible crop cutting knife. This application discloses an arrangement in which the header frame is rigid and supports rigid ends of the cutter bar with a center section of the cutter bar being flexible upwardly and downwardly and the control of inner frame elements of the otherwise rigid header construction.

The assignee of the present application which is Macdon Industries of Winnipeg Manitoba Canada manufactures a header where the feed system uses drapers which can be used on a swather tractor or on a combine harvester using an adapter and this is sold under the designation 962 or 972. This machine provides the basis for the present invention and the present invention uses many of the constructions of this machine. Reference is made therefore to this machine which is well known and readily available to one skilled in this art for the engineering and constructional details which are omitted from the schematic illustrations herein.

SUMMARY OF THE INVENTION

It is one object of the present invention to provide an improved header which allows flexible movement of the cutter bar.

According to a first aspect of the invention there is provided a crop harvesting header comprising:

a main frame structure extending across a width of the header for movement in a forward direction generally at right angles to the width across ground including a crop to be harvested;

a mounting assembly for carrying the main frame structure on a propulsion vehicle;

a crop receiving table carried on the main frame structure across the width of the header;

a cutter bar across a front of the table arranged to move over the ground in a cutting action and carrying a cutter knife operable for cutting the crop as the header is moved forwardly across the ground for depositing the crop onto the table;

a skid element extending across the width of the header for engaging the ground so as to receive lifting forces from the ground at whatever points of the skid element contact the ground tending to lift the cutter bar;

a crop transport system on the table for moving the cut crop toward a discharge location of the header;

the main frame structure being divided into a first frame portion and a second separate frame portion with the second connected to the first by a pivot coupling arranged for pivotal movement of the second relative to the first about a pivot axis extending in a plane parallel to the forward direction and intersecting the cutter bar so that, as the second pivots relative to the first, the cutter bar bends in the area adjacent the respective pivot axis to accommodate the pivotal movement;

the pivot coupling of the second frame portion relative to the first frame portion being arranged such that weight from the second frame portion outboard of the pivot coupling tends to rotate the second frame portion about the pivot coupling in a downward direction;

the mounting assembly including a support assembly arranged to provide a total lifting force from the propulsion vehicle acting to support the main frame structure for floating movement relative to the propulsion vehicle such that upward pressure from the ground on the skid element, which is greater than a downward force from a part of the weight of the header unsupported by the lifting force, tends to lift the main frame structure relative to the propulsion vehicle;

the support assembly being arranged such that the total lifting force can be varied so that the total downward force, from that part of the weight of the header which is unsupported by the lifting force, can be varied to change the total pressure of the skid element on the ground;

the support assembly including a first component arranged to provide a first lifting force for the first frame portion;

the support assembly including a second component arranged to provide a second lifting force for the second frame portion;

the support assembly being arranged to provide floating movement for each of the first and second frame portions relative to each other and relative to the propulsion vehicle such that upward pressure from the ground on the skid element, which is greater than a downward force from a part of the weight of the header unsupported by the lifting force, tends to lift each of the first and second frame portions relative to the propulsion vehicle;

the first and second components being arranged such that the first and second lifting forces vary as the total lifting force is varied and such that the lifting force is balanced across the width of the first and second frame portions.

In many cases, as defined hereinafter there is provided a central section mounted on the vehicle and two wing sections, which is in most cases the most practical arrangement providing sufficient flexibility without excessive complication and expense. However the principles of this invention can be applied to alternative constructions can be used which allow a plurality of sections to be carried on a propulsion vehicle and for the weight per unit length of each as applied to the ground to vary as the total weight is varied.

Thus in one example there may also be two additional outer wing portions each pivotally mounted to an outer end of the inner wing potion and each having a respective pivot coupling and linkage which controls the position of the cutter bar as defined herein.

In another construction there may be in effect only two wing portions where each is connected to the other for the pivotal movement defined herein.

In yet another construction there may be only one main portion and in effect a single wing pivoted from it.

The above definition of the invention therefore relates to the interconnection between the two portions without specifying how they are connected to the propulsion vehicle and without specifying whether there are more than one pivotal second portion. Further definitions of the invention more particularly directed to the three portions defined by the center portion and two wings are also included herein.

In most but not necessarily all cases, the header will include a conventional reel. If included, the fact that the reel is mounted in conventional manner so that its position is in a specified location relative to the main frame of each portion ensures that it is in a specific relation to the cutter bar or each portion. Thus the reel can be mounted at one end in on one portion and at the other end on the other portion which locates those ends relative to the cutter bar at the respective ends and avoids the situation where the cutter bar position is indeterminate relative to the reel. While there is still movement between the reel and the cutter bar, thus changing the spacing between the fingers and the cutter bar, this will be much less than for a conventional flexing cutter bar where the cutter bar can flex relative to the frame and thus relative to the reel. In the preferred arrangement where the frame includes a center portion and two wing portions, the reel may be located on two end arms each supported on the outer ends of the wing portions and also on a central arm mid way across the center portion, since this provides three points where the inter-relation between the reel and the cutter bar is specified, even though the positions in between may vary. In another arrangement, the reel may be mounted on four arms, two at each end and two at the pivot points, which provides improved control over the reel to cutter bar distance but increases the complexity of the reel.

The reel is preferably of the type mounted on conventional arms pivoted to the frame which allow adjustment of the height of the reel relative to the cutter bar. Suitable engineering arrangements for providing the necessary flexing and expansion of the sections of the reel to accommodate the flexing action of the header are well known to one skilled in the art. In addition, fixed reels attached at fixed location to end sheets of the header frame could also be used and the invention is not limited in this regard.

The term "spring" as used in this document is not intended to be limited to a particularly type of element which provides a spring or biasing force but merely defies any element which will allow resilient movement of one component relative to another. This can be provided by a mechanical flexing link such as a coil or tension spring or can be provided by fluid such as air or hydraulic cylinders and the term is also intended to include the suitable mechanical couplings of those links to the required elements. Hydraulic cylinders with suitable accumulators for taking up and releasing fluid to the cylinders are effective in this regard.

The above definition refers to "bending" of the cutter bar. This bending movement can be obtained by providing a specific hinge between two parts of the bar or by providing a cutter bar which can flex sufficiently to accommodate the required bending without the necessity for an actual hinge defining a specific pivot axis.

The term "skid element" used in the above definition is not intended to be limited to a particular component of the header and may be provided by any element which physically engages the ground as the cutter bar and knife elements carried thereby proceed across the ground. Thus the skid element may be provided by the cutter bar itself or by an additional component behind the cutter bar. In addition, closely spaced rollers or other elements which roll over the ground and thus reduce friction may be used provided that the lifting force is spread evenly across the cutter bar to provide the floating action to which this invention is directed, although this is not generally necessary and not conventionally used.

The mounting assembly may be an adapter frame arranged for connection of the header to an existing feeder house of a combine harvester. However such an adapter is not essential and the mounting assembly may be constituted by simply connecting elements which directly couple the header to the combine harvester.

In one preferred arrangement, the linkage is arranged such that adjustment of the mounting assembly to effect variation of the total downward force automatically provides adjustment of the linkage such that the downward force of the second frame portion varies separately as the total downward force is varied.

Preferably the linkage is arranged to provide a spring coupling to the first frame portion for floating movement of the outboard weight of the second frame portion to the first frame portion. In this arrangement, the linkage is preferably a non-spring linkage and the spring coupling is provided by a connection to said at least one spring of the mounting assembly such that the floating movement is provided at least partly by said at least one spring.

Where the adjustment of the linkage is effected automatically, this can conveniently be done by the linkage including a pivotal balance beam to which is applied as three balanced forces a) said lifting force from the propulsion vehicle, b) at least part of the weight from the first frame portion and said weight applied to the first frame portion from the second frame portion at the pivot coupling and c) said outboard weight of the second frame portion. In this arrangement, the balance beam is preferably located at the first frame portion, the balance beam preferably extends in the forward direction, the mounting assembly preferably includes a lift arm extending in the forward direction parallel to and underneath the balance beam and the lift arm is preferably arranged to apply to the balance beam force a) at a position forwardly of force b) which is applied forwardly of force c). Also preferably the linkage includes a tension link extending from the second frame portion to the first frame portion at a position above the pivot coupling and arranged to connect to the balance beam to apply said force c) thereto in an upward direction, where the tension link includes a bell crank on the first frame portion above the balance beam.

Preferably the bell crank is adjustable to balance the forces b) and c) to hold the cutter bar straight when the upward pressure from the ground is constant along the cutter bar.

As is conventional, preferably the mounting assembly includes two lift arms each carried on a respective spring and spaced apart across the first portion such that the first portion can float upwardly and can twist about an axis in the forward direction, with each spring carrying a part of the weight of the header.

Preferably, where each of the portions includes a conventional horizontal main frame beam, the pivot coupling between the second frame portion and the first frame portion is arranged below the main beams.

Preferably the pivotal movement between the second frame portion and the first frame portion is less than a total of 6 degrees and more preferably less than 4 degrees, which angles are sufficient to provide the flexibility of the cutter bar which is required without providing any additional movement for transport or the like. This limited movement provides a simple construction and may avoid the necessity for a hinge in the cutter bar while allowing a single high speed knife to move along the cutter bar through the hinge or flex section.

In most cases the header is unsupported by ground wheels such that all lifting forces from the ground are communicated through said skid element.

In accordance with an important preferred aspect of the invention there is provided a bottom stop member arranged such that downward floating movement of the header is halted at a bottom position when the header is lifted to a raised position in which the skid element is spaced from the ground so that there is no lifting force from the ground and wherein there is provided a balance mechanism to balance the second portion in aligned position so the cutter bar is straight when the header is in the raised position.

Where the linkage includes a pivotal balance beam as set forth above, the balance mechanism may be arranged to apply balance forces from the bottom stop member to the balance beam.

In accordance with an alternative arrangement, the interconnecting linkage which transfers the outboard weight of the second frame portion to the first frame portion may include its own spring separate from the spring of the mounting assembly, the spring being arranged such that a spring force provided thereby is adjustable in response to the variation of the lifting force provided by the mounting assembly such that the downward force of the second frame portion varies separately as the total downward force is varied.

In accordance with another alternative arrangement, the interconnecting linkage which transfers the outboard weight of the second frame portion to the first frame portion may include an actively driven coupling for adjusting the height of the outboard end of the second portion and there is provided a sensor responsive to changes in lifting force from the ground at points along the cutter bar for controlling the actively driven coupling. This arrangement thus provides a construction which relies on sensors to maintain the required balance of the system rather than using the forces from the ground in the balancing action as used in the balance beam system defined above. However this arrangement, while more complex and more reliant on sensors, can also be used and falls within the scope of this invention.

In accordance with second aspect of the invention there is provided a crop harvesting header comprising:

a main frame structure extending across a width of the header for movement in a forward direction generally at right angles to the width across ground including a crop to be harvested;

a mounting assembly for carrying the main frame structure on a propulsion vehicle;

a crop receiving table carried on the main frame structure across the width of the header;

a cutter bar across a front of the table arranged to move over the ground in a cutting action and carrying a cutter knife operable for cutting the crop as the header is moved forwardly across the ground for depositing the crop onto the table;

a skid element extending across the width of the header for engaging the ground so as to receive lifting forces from the ground at whatever points of the skid element contact the ground tending to lift the cutter bar;

a crop transport system on the table for moving the cut crop toward a discharge location of the header;

the main frame structure being divided into a first frame portion and a second separate frame portion with the second connected to the first by a pivot coupling arranged for pivotal movement of the second relative to the first about a pivot axis extending in a plane parallel to the forward direction and intersecting the cutter bar so that, as the second pivots relative to the first, the cutter bar bends in the area adjacent the respective pivot axis to accommodate the pivotal movement;

the pivot coupling of the second frame portion relative to the first frame portion being arranged such that weight from the second frame portion outboard of the pivot coupling tends to rotate the second frame portion about the pivot coupling in a downward direction;

the mounting assembly including a support assembly arranged to provide a total lifting force from the propulsion vehicle acting to support the main frame structure for floating movement relative to the propulsion vehicle;

the support assembly being arranged such that the lifting force can be varied;

the support assembly including a first component arranged to provide a first lifting force for the first frame portion;

the support assembly including a second component arranged to provide a second lifting force for the second frame portion;

wherein the support assembly includes a balancing connection between the first and second components which is arranged such that adjustment of the support assembly to effect variation of the total lifting force automatically balances the first and second lifting forces proportionally and such that the lifting force is balanced across the width of the first and second frame portions.

Preferably the balancing connection comprises a pivotal balance beam to which is applied as three balanced forces a) said total lifting force from the propulsion vehicle, b) said first lifting force and c) said second lifting force.

While this definition refers to the use of two portions, it will again be appreciated that more than two portions and preferably the three portions arranged in center and two wing format can be used.

According to a third aspect of the invention there is provided a crop harvesting header comprising:

a main frame structure extending across a width of the header for movement in a forward direction generally at right angles to the width across ground including a crop to be harvested;

a mounting assembly for carrying the main frame structure on a propulsion vehicle;

a crop receiving table carried on the main frame structure across the width of the header;

a cutter bar across a front of the table arranged to move over the ground in a cutting action and carrying a cutter knife operable for cutting the crop as the header is moved forwardly across the ground for depositing the crop onto the table;

a skid element extending across the width of the header for engaging the ground so as to receive lifting forces from the ground at whatever points of the skid element contact the ground tending to lift the cutter bar;

a crop transport system on the table for moving the cut crop toward a discharge location of the header;

the main frame structure being divided into a first frame portion and a second separate frame portion with the second connected to the first by a pivot coupling arranged for pivotal movement of the second relative to the first about a pivot axis extending in a plane parallel to the forward direction and intersecting the cutter bar so that, as the second pivots relative to the first, the cutter bar bends in the area adjacent the respective pivot axis to accommodate the pivotal movement;

the pivot coupling of the second frame portion relative to the first frame portion being arranged such that weight from the second frame portion outboard of the pivot coupling tends to rotate the second frame portion about the pivot coupling in a downward direction;

the mounting assembly including at least a support assembly arranged to provide a lifting force from the propulsion vehicle acting to support the main frame structure for floating movement relative to the propulsion vehicle;

the support assembly being arranged such that the lifting force can be varied;

the support assembly including a first component arranged to provide a first lifting force for the first frame portion;

the support assembly including a second component arranged to provide a second lifting force for the second frame portion;

the support assembly being arranged to provide floating movement for each of the first and second frame portions relative to each other and relative to the propulsion vehicle;

wherein there is provided a bottom stop member arranged such that downward floating movement of the header is halted at a bottom position when the header is lifted to a raised position in which the skid element is spaced from the ground;

and wherein there is provided a balance mechanism to balance the first and second portions in aligned position so the cutter bar is straight when the header is in the raised position.

Again this definition refers to the use of two portions, but it will again be appreciated that more than two portions and preferably the three portions arranged in center and two wing format can be used.

BRIEF DESCRIPTION OF THE DRAWINGS

One embodiment of the invention will now be described in conjunction with the accompanying drawings in which:

FIGS. 7, 8 and 8A show three positions of a balancing link which is located at the balance beam of FIG. 5 for holding the cutter bar straight in the raised position of the header FIG. 9 is a top plan view of the cutter bar showing the use of a hinge coupling to allow bending of the cutter bar on the pivot axis.

FIGS. 10 and 11 are cross sections along the lines A—A and B—B of FIG. 9.

FIG. 12 is a top plan view showing schematically a header having five sections including two outer wing sections.

FIG. 13 is a rear elevational view of a part only of the header of FIG. 12 showing schematically the linkage for automatically controlling the balancing of the lifting forces applied to each of the sections.

FIGS. 19 and 20 show an alternative arrangement in which the rear tension link shown particularly in FIGS. 3 to 6 is replaced by a compression link.

In the drawings like characters of reference indicate corresponding parts in the different figures.

DETAILED DESCRIPTION

Figure 1:
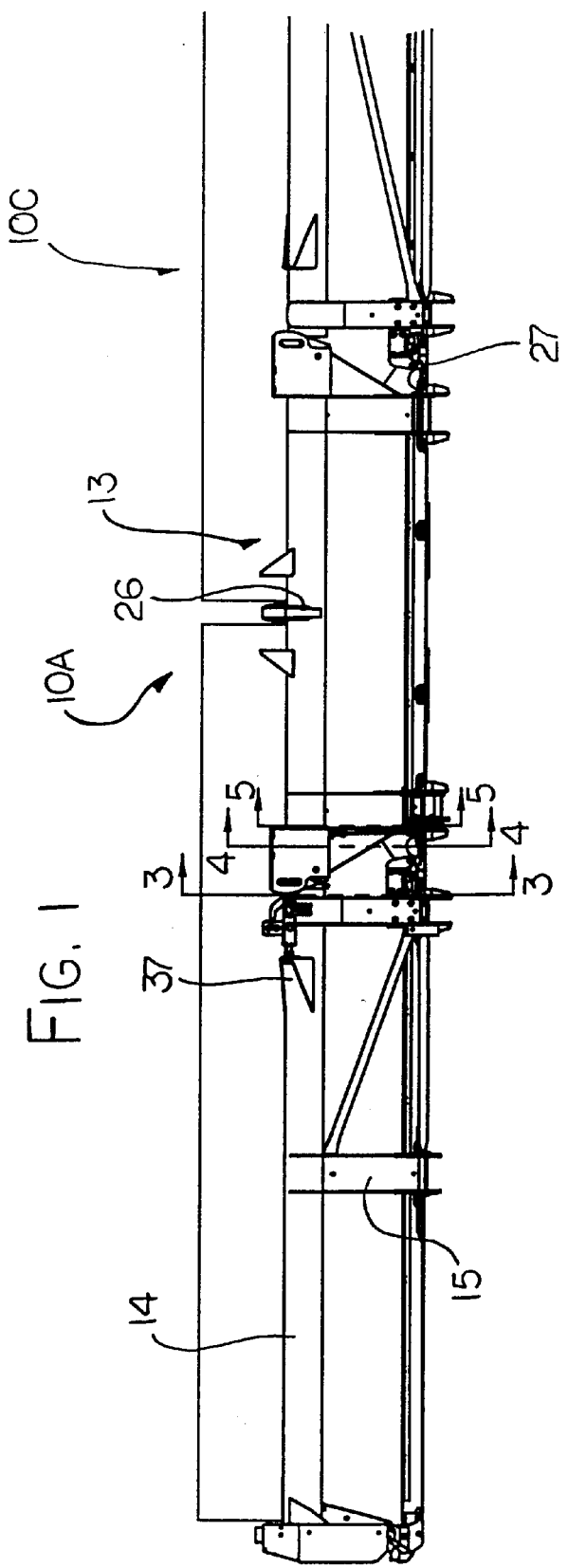
FIG. 1 is a schematic rear elevational view of a first embodiment of a header according to the present invention with the combine harvester which acts as a propulsion vehicle and the associated adapter being omitted for convenience of illustration.
Figure 2:
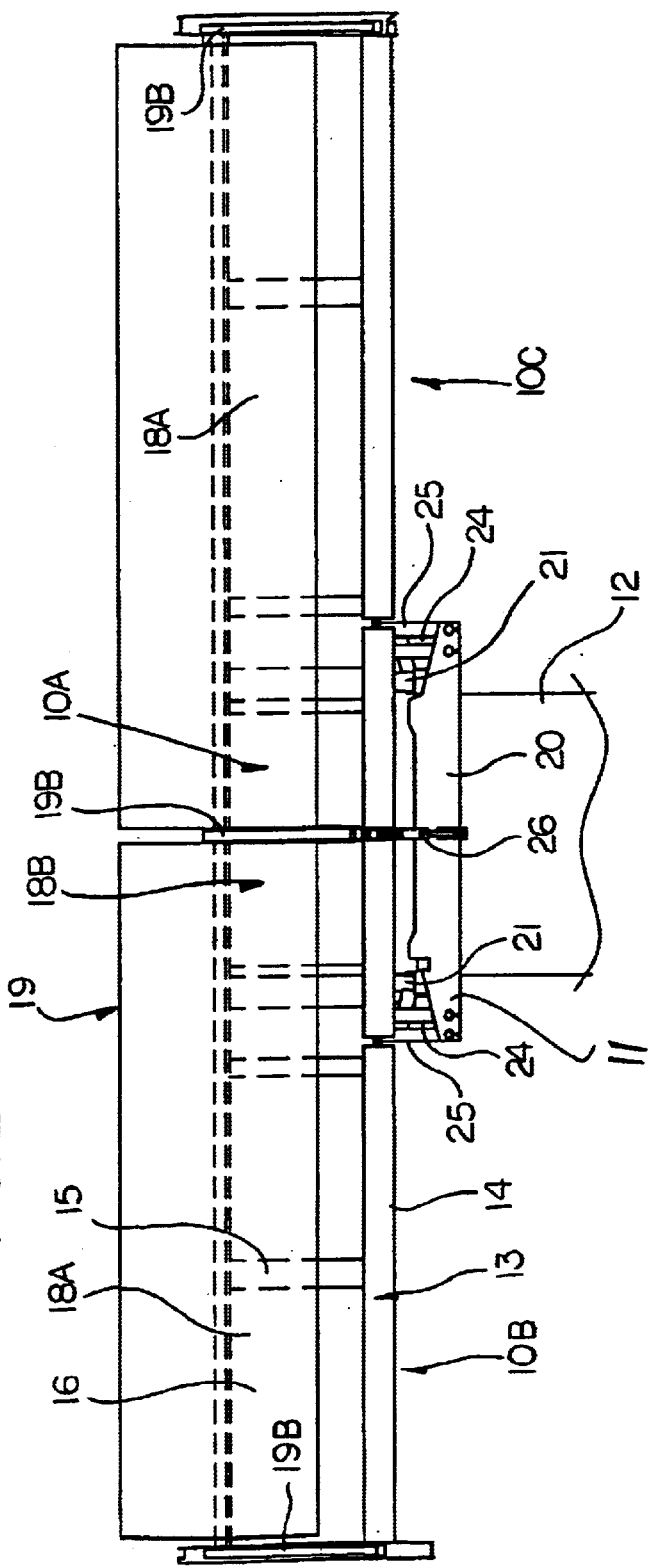
FIG. 2 is a schematic top plan view of the header of FIG. 1.
Figure 3:
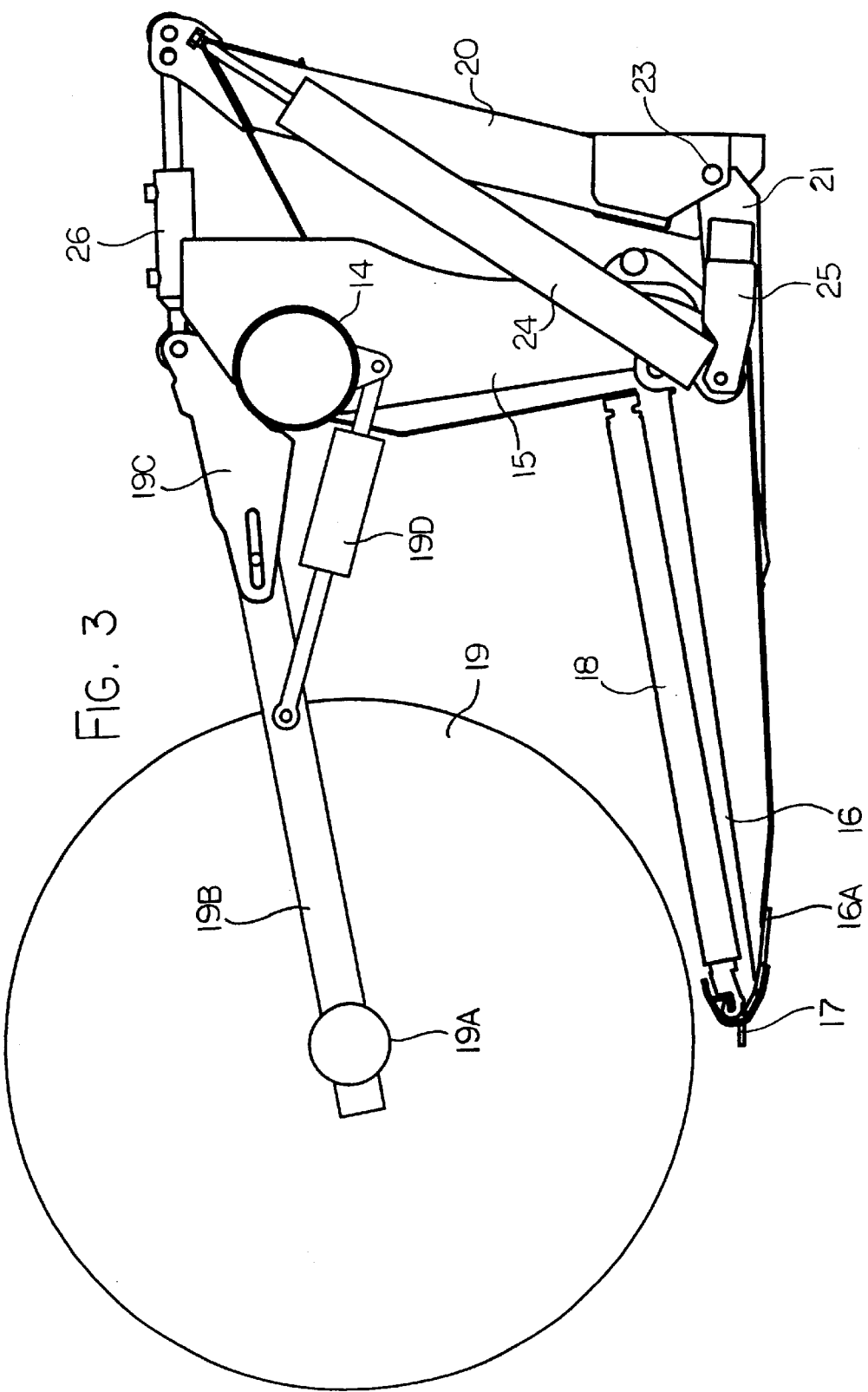
FIGS. 3, 4 and 5 are a cross sectional views respectively along the lines 3—3, 4—4 and 5—5 of FIG. 1 including the adapter and float system and showing the interconnecting linkage and balance beam connecting one wing frame portion to the central frame portion.

FIGS. 1 and 2 show in rear elevational view and in plan view respectively a header 10 carried on an adapter 11 attached to the feeder house 12 of a combine harvester. In FIG. 1 the adapter is omitted for convenience of illustration.

The header 10 includes a frame 13 defined by a main rear beam 14 and a plurality of forwardly extending arms 15 which extend downwardly from the beam 14 and then forwardly underneath a table 16 which extends across the header. At the forward end of the table 16 is provided a cutter bar 17. On top of the table 16 is provided a draper transport system 18 which carries the crop from the cutter bar across the header to a discharge location at the feeder house 12. The draper thus include two side drapers extending from respective ends of the header inwardly toward the feeder house and a center adapter section 18B which acts to feed the crop from the side drapers 18A rearwardly to the feeder housing.

Reference is made to prior application Ser. No. 09/810,425 filed Mar. 19, 2001 and to application Ser. No. 09/965,119 filed Sep. 28, 2001 which disclose details of the adapter and its inter relation to the side drapers 18A, the disclosure of which is incorporated herein by reference.

The header further includes a reel 19 including a beam 19A on which is mounted a plurality of reel bats (not shown) which are carried on the beam 19A for rotation with the beam around the axis of the beam. The beam is carried on reel support arms 19B which extend from the beam rearwardly and upwardly to a support bracket attached to the transverse main beam 14. The reel arms can be raised and lowered by hydraulic cylinders 19D connected between the respective arm and the beam 14.

In the embodiment shown the reel is mounted on three arms 19B including two arms at the ends of the header and a single center arm. However additional arms may be provided so that there are four such arms with two center arms being spaced apart either side of the adapter 11. It is well known to provide an arrangement of the beam 19A and the bats which accommodate flexing movement of the reel so that one end can be higher than the other end without damaging the bats or the reel structure. Various different arrangements for accommodating such flexing movement are known and can be incorporated into the arrangement described herein, as is well known to one skilled in the art.

The above description of the header refers only schematically to the construction since the details of the construction are well known to one skilled in the art from the above designated machine 962 or 972 manufactured by the Assignee.

The adapter 11 comprises a frame 20 which attaches to the feeder house 12 and carries at its lower end a pair of forwardly extending pivotal arms 21 which extend forwardly underneath respective ones of the frame members 15 of the header. The pivotal arms 21 can pivot upwardly and downwardly about a respective pivot pins 23 each independently of the other arm. Each arm is supported by a respective spring 24 carried on a respective stub arm 25 attached to the respective arm 21. Thus the spring 24 provides tension on the stub arm 25 pulling it upwardly around the pin 23 which acts to pull up the respective arm 21 and provide a lifting force underneath the header at a lifting point partway along the respective frame member 15 and underneath the draper 18 and the table 16.

At the center of the adapter is provided a link 26 which extends from the frame 20 forwardly to the central bracket 19C of the beam arm support brackets. The link 26 is provided in the form of a hydraulic cylinder which allows adjustment of the length of the cylinder thus pivoting the header forwardly and rearwardly about the support point of the arms 21 on the underside of the header. Thus the attitude of the header, that is the angle of the table 16 to the horizontal can be tilted by operation of the cylinder forming the link 26.

In addition the attitude of the header about an axis extending forwardly of the direction of movement that is at right angles to the transverse beam 14 is effected by the independent pivotal movement of the arms 21 provided by the springs 24 which act as a floatation system. In addition the whole header can float upwardly and downwardly on the springs 24 with the link 26 pivoting to accommodate the upward and downward movement and the arms 21 pivoting about the respective pin 23.

The table 16 provides behind the cutter bar 17 a skid plate 16A which is arranged to engage the ground. Thus upward force is provided from the ground which tends to lift the header taking weight off the support springs 24. In practice the springs are adjusted so that the springs act to support the majority of the weight of the header leaving a relatively small proportion of the weight to rest on the ground. Thus the header can float upwardly and downwardly as the ground provides areas of different height with one end of the header being movable upwardly independently of the other end by independent flexing of the springs 24. Thus the header tends to follow the ground level.

The above description applies both to the conventional rigid header where the transverse beam 14 is substantially rigid along its length. Further details of this machine and its operation can be obtained from the machine itself and where designation 962 or 972 or from operation manuals relating to the machine, all of which are publicly available.

The arrangement of the present invention provides an improvement by which the header is formed in a number of sections which are independently pivotal each relative to the next and in which adjustment of the lifting force provided by the springs 24 is transferred to each of the sections proportionally so that each section can float upwardly and downwardly and each section applies a force to the ground which is proportional to the total force of the whole header.

Thus the beam 14 is divided into a number of separate pieces depending upon the number of sections of the header. In the embodiment shown there are three sections including a center section 10A, a first wing section 10B and a second wing section 10C. The center section 10A is mounted at the adapter so that the arms 21 extend into engagement with the center section. The wing sections are pivotally connected to the center section such that each can pivot upwardly and downwardly about a respective pivot axis generally parallel to the direction of movement.

Figure 6:
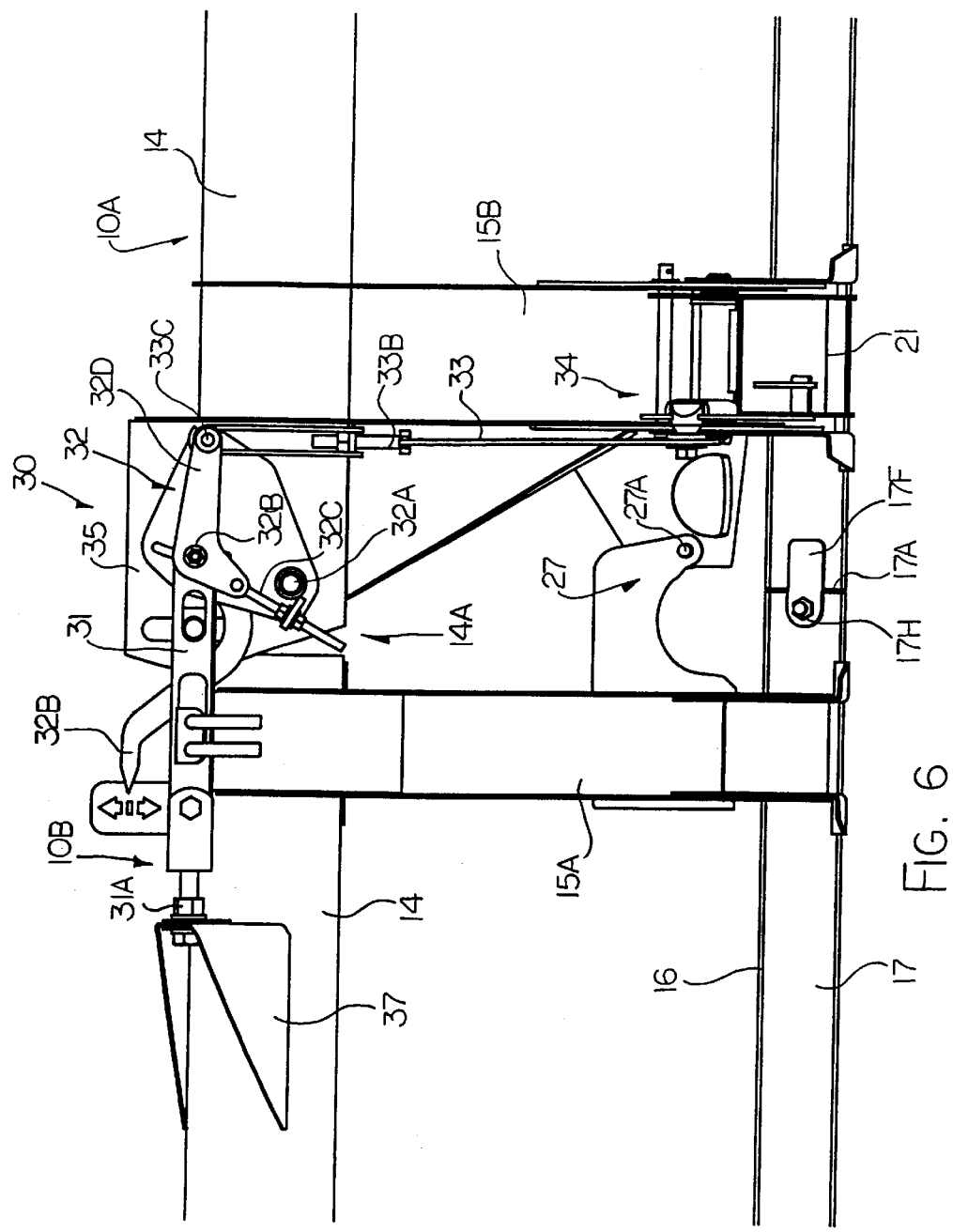
FIG. 6 is a rear elevational view on an enlarged scale of a part only of FIG. 1 showing the interconnecting linkage from one wing portion to the center portion.

Thus the beam 14 is split into three portions each co-operating with a respective one of the sections 10A, 10B and 10C and defining a main beam therefor. Each section of the beam 14 includes respective ones of the frame members 15 which support the respective portion of the table. Thus as best shown in FIG. 6, there is a break 14A between the beam sections 14 of the center section 10A and one wing section 10B. The end most frame member 15A of the wing section 10B is arranged at the break. The end frame member 15B of the center section 10A is spaced inwardly from the break leaving space for a pivot coupling 27 extending from the frame member 15A to the frame member 15B and defining a pivot pin 27A lying on the pivot axis between the wing section 10B and the center section 10A. In the rear elevational view of FIG. 6, the cutter bar 17 is also visible underneath the header at the forward end of the frame members 15 and at the front of the table 16.

In the embodiment shown the cutter bar 17 is split at a junction 17A lying along the axis of the pin 27A so as to provide a pivot within the cutter bar allowing the cutter bar to bend at the junction 17A.

In an alternative arrangement (not shown) the cutter bar can be formed in a manner which allows it to flex on the axis of the pin 27A thus avoiding the necessity for a break in the cutter bar.

The cutter bar 17 is shown in more detail in FIGS. 9, 10 and 11. The cutter bar is of conventional shape including a U shaped member 17B with generally horizontal legs and a front curved nose 17C to which is attached the knife support flange 17D of a conventional nature. The knife support flange includes a plurality of holes 17E for mounting conventional knife guards shown in FIGS. 10 and 11.

A bridging link 17F is connected across the break 17A so as to hold the sections of the cutter bar 17 aligned while the pivotal movement occurs. The link 17F comprises a plate welded to one part of the cutter bar as indicated at 17B with the link or plates spanning the break 17A and extending to a pin 17H which is welded to the other part of the cutter bar as indicated at 17J with the link 17G being held in place by a nut 17L.

Thus the two sections 10A and 10B are supported each relative to the other for pivotal movement of the wing section 10B about an axis extending through the pin 27A and through the break 17A so that the wing section is supported at its inner end on the center section but can pivot downwardly at its outer end so that the weight at the outboard end is unsupported by the center section and causes downward or counter clockwise pivotal movement of the wing section 10B.

The wing section 10C is mounted in an identical or symmetrical manner for pivotal movement about the other end of the center section 10A. The amount of pivotal movement allowed of the wing section relative to the center section about the axis of the pivot pin 27A is maintained at a small angle generally less than 6° and preferably less than 4° as controlled by suitable mechanical stop members which are provided at a suitable location with the required mechanical strength to support the wing frame section against upward or downward movement beyond the stop members. Suitable stop members can be designed by a person skilled in the art and the details of the stop members are not described herein.

The outboard weight of the wing section 10B is supported on a linkage 30 which communicates that weight from the inner end of the beam 14 of the section 10B through to the support for the center section 10A at the springs 24. The linkage is shown particularly in FIGS. 4 and 6 and includes a tension link 31 extending from the inner end of the beam 14 to a bell crank 32 at the outer end of the center section 10A on the beam 14 together with a further tension link 33 which extends downwardly from the bell crank to a balance beam 34 located on the center section 10A at its inter connection with the arm 21.

In general the linkage operates to transfer the outboard weight of the wing section inwardly to the center section and at the same time to balance the lifting force provided by the springs 24 so that it is proportionally applied to the center section and to the wing section.

Thus in general the header is attached to the combine feeder house using the float system described previously that supports the header so that it can be moved up when a vertical force about 1% to 15% of its weight is applied to the cutter bar from the ground. The reaction of the float linkage that typically supports 85% to 99% of the header weight on the header is used to balance the weight of the wings.

The system is designed so that if the operator sets the float so that the float system supports 99% of the header weight then the remaining 1% will be evenly distributed across the cutter bar. If the operator changes the float so that 85% is supported by the combine harvester then the remaining 15% would also be evenly distributed across the cutter bar without the operator making adjustments. Thus, not only is the total lifting force to each sections varied in proportion to the total lifting force but also that lifting force on each section is balanced across the width of section. As the sections are rigid between the ends, this requires that the lifting forces be balance between the ends to ensure the even distribution across the cutter bar of each section and thus of all the sections. This provides an arrangement in which the force required to lift the header is the same force at any location along the length of the cutter bar, whether that location is at the center section, at a junction between the center section and the wing section or at the wing section. This is achieved in this embodiment by the balancing system which transfers lifting force between the sections with the forces being balanced by the balance beam.

The header frame sections and the reel sections are hinged and supported so that the reel will stay in approximately the same position relative to the cutter bar. Thus the balance beam 34 as described in more detail hereinafter balances the lifting force applied to the ends of the center section relative to the lifting force which is applied to the outboard weight of the wing section so that the lifting force is even across the width of the header. Thus if a lifting force is applied by the ground or any other lifting mechanism for example merely manually lifting the header at a particular location across its width, that would cause the header to rise at that point and to fall at other points. The amount of force necessary to lift the header at that point will be the same as it is at other points and this lifting force can be varied for the total header and proportioned across the width of the header automatically by the balance beams as described hereinafter.

It will be appreciated that the inboard weight of the wing section is transferred through the pivot 27 to the outboard end of the center section and that weight is transferred directly to the balance beam. Also the outboard weight of the wing section is transferred through the tension links and the bell crank to the balance beam. Yet further a lifting force from the arm 21 is applied to the balance beam.

Figure 4:
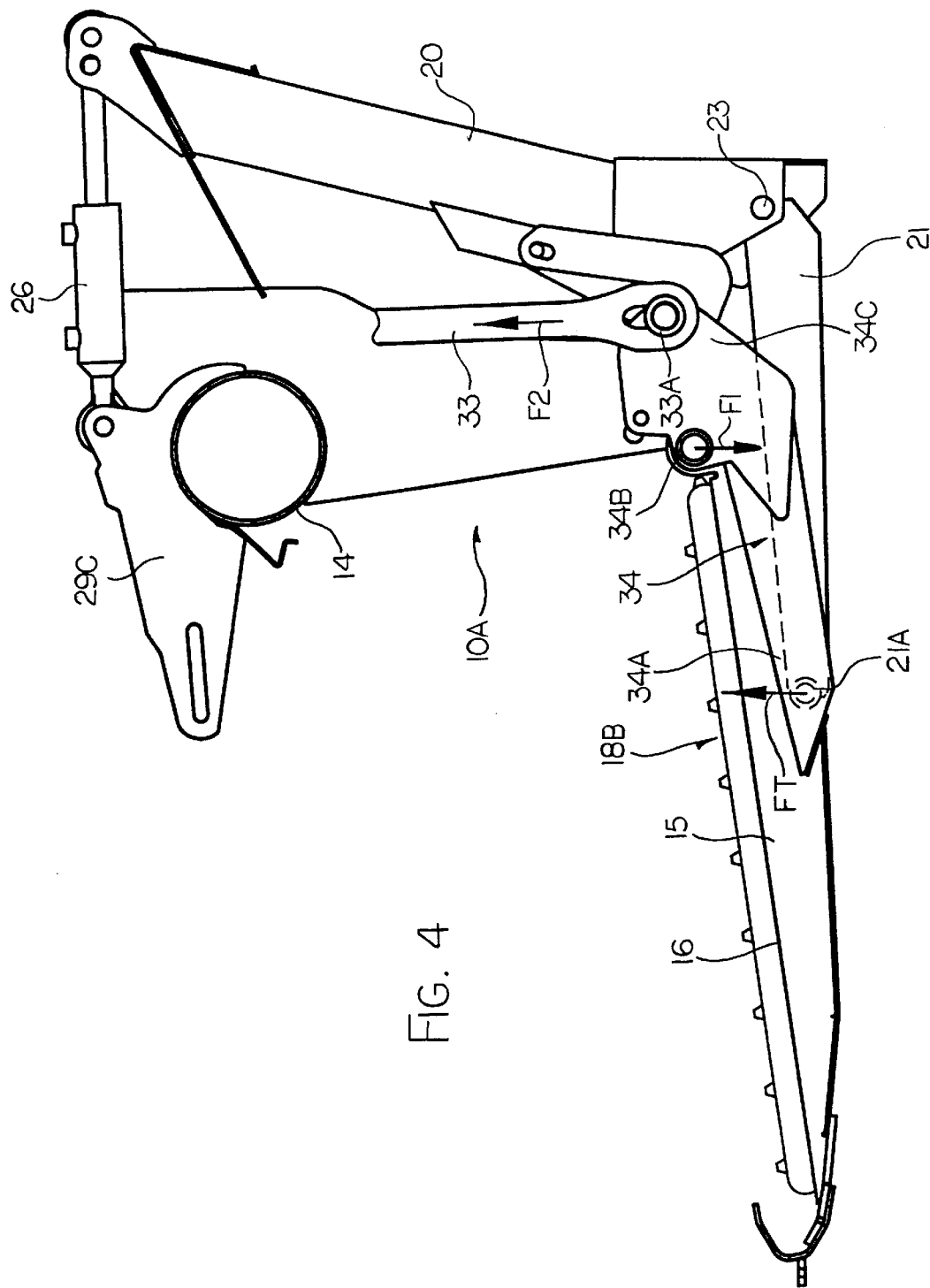

Thus reviewing FIG. 4, the balance beam is located immediately at the arm 21 and above the arm 21 so that the arm 21 extends forwardly to a forward lifting point 21A which engages underneath a forward end 34A of the balance beam. Thus the lifting force from the arm 21 is applied upwardly at the point 21A which is forward of the beam 14 and underneath the table 16.

The balance beam 34 extends rearwardly from the forward end 34A to a pivot 34B and from the pivot rearwardly to a rear end 34C to which is connected the tension link 33 at a bushing 33A. The tension link thus applies an upward pulling force F2 which act to support the outboard weight of the wing section.

The pivot pin 34B is attached to the center section so that the weight from the center section is transferred to the pivot pin and through that pin to the balance beam. There is otherwise no direct connection between the center section and the arm 21 so that the weight of the center section is wholly applied through the pin to the balance beam as a force F1.

The lifting force from the arm 21 is wholly applied to the outer end 34A of the balance beam as a force FT. Thus these three forces are all applied to the balance beam and the balance beam acts to automatically proportion the forces F1 and F2 relative to the lifting force FT.

Thus the support assembly includes a first component which is the pin 34B to provide a lifting force for the center frame portion. The support assembly which is the linkage includes a second component which is a tension link 33 arranged to provide a lifting force F2 for the outboard weight of the second or wing frame portion.

The whole support assembly including the balance beam, the lift arm 21 and the springs 24 are arranged to provide a floating movement for each of the first and second frame portions that is the center and wing frame portions relative to each other and relative to the propulsion vehicle such that upward pressure from the ground on the skid element 16A which is greater in a downward force for a part of the weight of the header and supported by the lifting force tends to lift each of the center and wing frame portions relative to the propulsion vehicle.

The balance beam arrangement is arranged such that the first and second lifting forces F1 and F2 are varied proportionally as the total lifting force FT is varied.

The balance beam 34 forms a balancing connection which supports these forces. It will be appreciated that the balance beam could be provided by other balancing connections which are not necessarily linear and not necessarily even mechanical. It is convenient that the balance beam is located at the arm 21 since there is a suitable location and space for receiving the balance beam and the forces can be readily applied at that location. However other mechanical arrangements can be provided where the balancing connection is located at other points.

It will be noted that the tension link provided by the link 32, link 33 and the bell crank 32 includes no spring connection and is a direct mechanical linkage so that the spring action or floating action of the wing section is provided by the spring 24.

The balance beam extends parallel to the arm 21 so that the pivot pins 34B and 33A have an axis at right angles to the balance beam and to the arm 21. The forces extend generally at right angles to the arm 21 since the arm 21 is generally horizontal underneath the header frame and underneath the balance beam.

The bell crank 32 is located and supported on the beam 14 so that the link 31 extends along the length of the beam 14 across the space 14A. Thus the link 31 is located above the pivot 27A and communicates forces by tension. However compression links could also be used in a different mechanical arrangement for example underneath the pivot. However the tension link arrangement is convenient since it provides relatively low forces which can be readily accommodated using relatively light components.

The bell crank includes a pivot 32A attached to a bracket 35 at the beam 14, the bracket 35 being supported by a brace 36. The bell crank carries a pointer 32B which projects upwardly to a visible point of the header so that the angle of the pointer 32B provides an indication to the operator of the vehicle of the attitude of the wing section relative to the center section. The pointer being mounted on the bell crank provides a relatively large mechanical advantage so that the changing angle of the pointer is greater than the changing angle of the wing section itself.

The link 31 is pivotally attached to the bell crank at a pivot connection pin 32B. The length of the tension link 31 can be adjusted by a threaded section 31A at the end of the link 31 which is shown at the end attached to the section 10A on a bracket 37. The link 33 is adjustable in length by a threaded rod 33B. The upper end of the link 33 is connected to the bell crank at a pivotal fastener pin 33C which transfers the load from the tension link to the bell crank. The position of the pin 32B relative to the pivot point 32A is adjusted by a threaded rod 32C which is connected to a lever 32D which pivots about the pin 33C, thus adjusting the mechanical advantage of the bell crank to vary the mechanical advantage transferred from the outboard weight of the wing section relative to the force F2. Thus the bell crank can be adjusted so that the forces F1 and F2 are balanced to produce approximately uniform contact pressure between the ground and the skid shoe.

The arrangement of the bell crank is also designed so that it tends to provide a balance point at the straight condition of the cutter bar with the forces away from that point increasing so as to avoid hunting of the system and to tend to bring the system back to the straight condition when the forces are removed.

Figure 7:
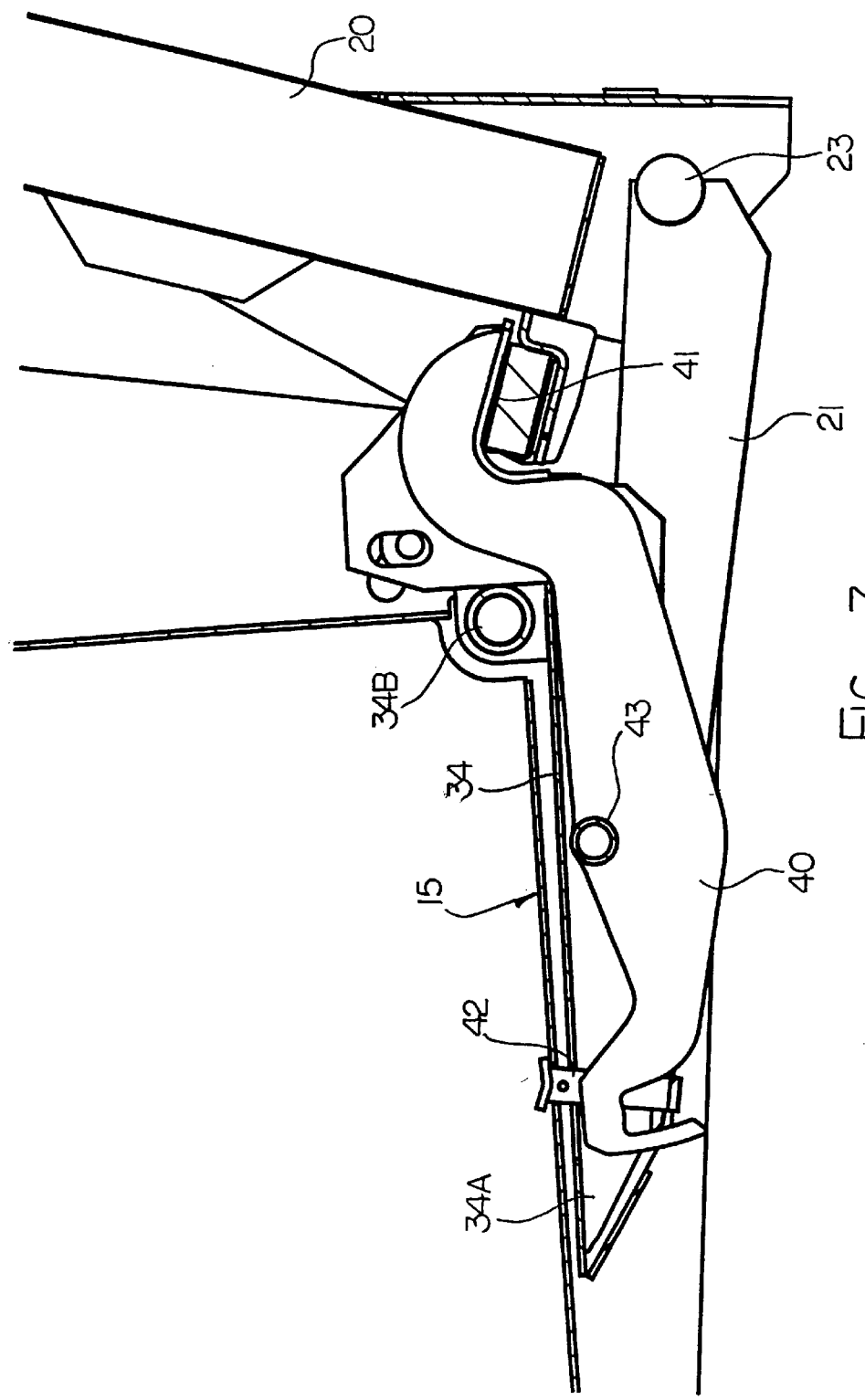
Figure 8:
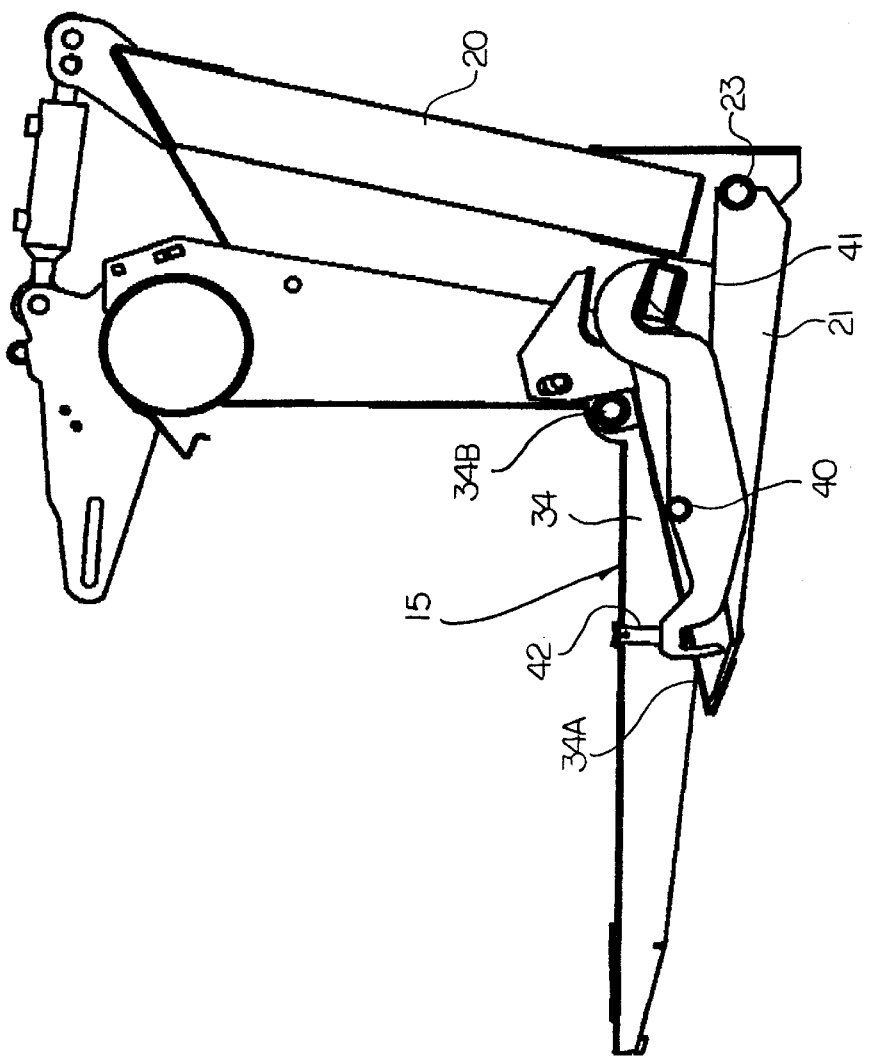

Thus the system is designed so that it takes a little less force to bring the cutterbar back to straight than it takes to move the cutterbar out of straight. The system is designed to overcome all friction and return it to a straight condition. The system is designed so that a minimum force will start raising or lowering the end of the cutterbar. The bell crank is designed so that the force will increase slightly as the cutterbar is moved to the maximum position up or down. Therefore the force required to return the cutterbar to the straight position is smaller than the force that was required to deflect it out of the straight position. This is what is defined as slightly stable. The system is designed to operate as follows:

1. the farmer wants to be able to cut crop as close as possible without pushing dirt.
2. The farmer makes initial adjustments to the header and go to the field to run and fine tune the adjustments.
3. In the field, he adjusts the total down pressure by raising or lowering the feeder housing to get the shortest stubble without pushing dirt too often.
4. He then changes the header angle to reduce the stubble height or reduce pushing dirt.
5. If the stubble is regularly too high at the outside of wings (close to the dividers) then the farmer adjusts the balance linkage to increase the weight on the wings.
6. if the wings are regularly pushing dirt then he reduces the weight on the wings by adjusting the balance linkage to reduce the weight on the wings.
7. the linkage is designed so that there is a consistent ratio between the weight on the centre section cutterbar and the wing cutterbar. However, there are minor geometry/load changes and it is not desirable for the wing to be significantly unstable at any time. By unstable it is understood that the wing would get lighter as it was raised from nominal position to maximum up position or it would get heavier as it is lowered from nominal position to lowest. In order to prevent that from occurring there is built in a small amount of stability.
8. The minor changes include:
   a. move reel fore or aft to change center of gravity location
   b. change header angle to change center of gravity location
   c. change header angle so that the hinge angle is changed. As the hinge angle is changed from horizontal the wing will get lighter because a given angle does not produce as much vertical movement (varies as the cosine of the hinge angle).
   d. The float spring is stretched as the header angle is increased thus making the wing lighter.
   e. Horizontal friction forces on the cutterbar as the header is skidded across the field will tend to make the wing lighter.
   f. Operating the header on a side hill will make the uphill wing lighter
9. It has been found that when the header is fine tuned in the field for best operation (shortest stubble and least pushing), the wings have been set heavy enough so that they tend to frown when header is raised In FIGS. 7, 8 and 8A is shown an additional balance link 40 located within the balance beam 34 for providing additional forces thereon. The balance link 40 co-operates with a stop member 41 on the adapter frame 20. The balance link 40 also cooperates with a hanging strap 42 at its forward end opposite the rear end which engages the stop 41. The balance link is pivoted to the balance beam 34 at a pivot pin 43.

Figure 5:
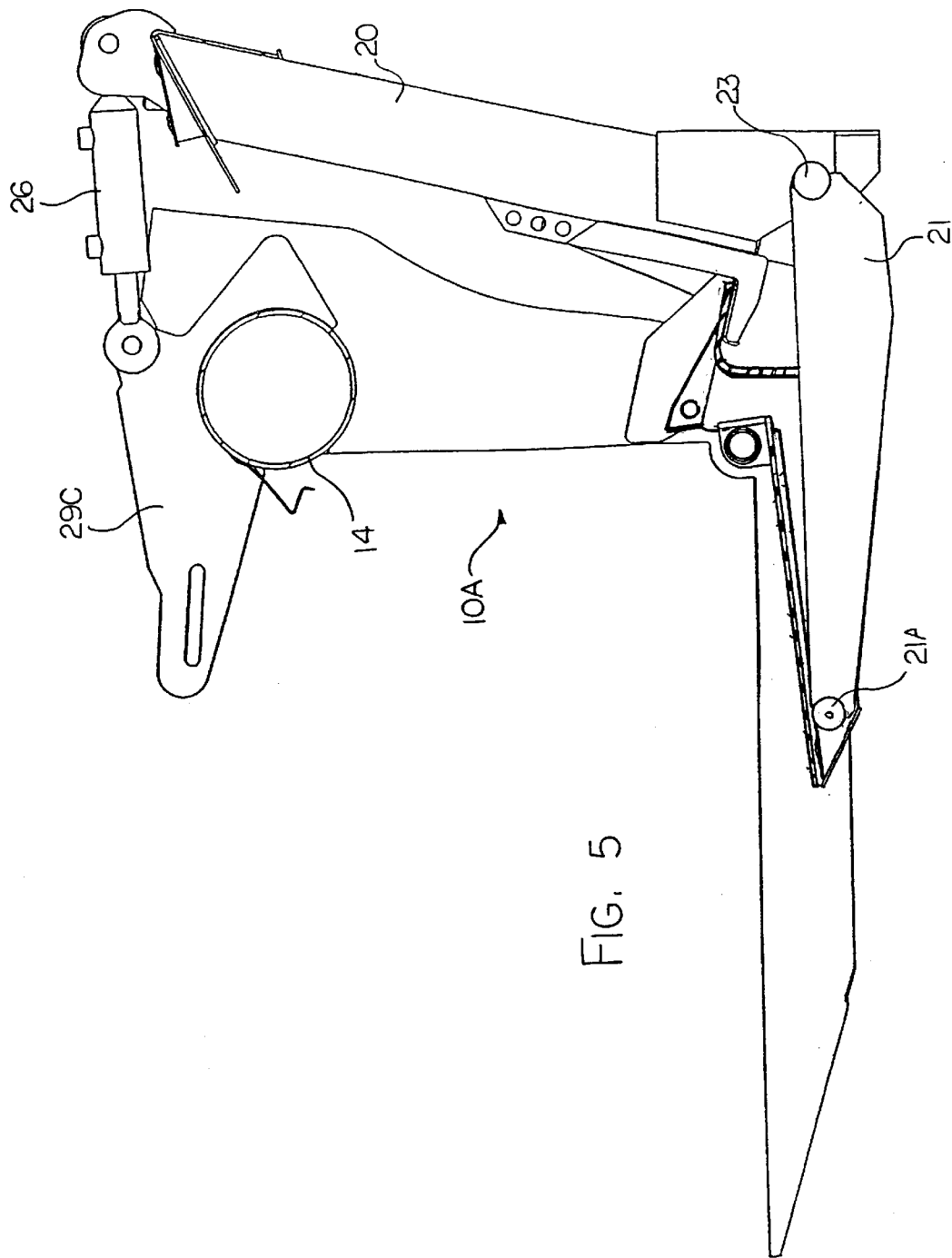

The function of the balance link 40 is that when the adapter frame 20 is raised by the operator raising the feeder house of the combine harvester so as to lift the header away from the ground, the center section falls since its weight exceeds the lifting force of the springs 24 until the balance beam 34 contacts the bottom stop on frame 20 as shown in FIG. 5 and supports the center section. At that bottom stop position, the rear end of the balancing link 40 also engages the stop 41 which provides a force on the balance beam 34 tending to move the balance beam to a position in which the wing sections are raised to a straight condition of the cutter bar. In the absence of the balance link 40 it will be appreciated that lifting of the center section would cause the wing sections to droop downwardly since the center section is raised on its stops while the wing sections are not supported and thus droop. The additional balance link 40 therefore communicates forces to the balance beam 34 so that the balance beam 34 pulls on the tension link system supporting the outboard weight of the wing section thus moving the wing section to its balance or straight condition of the cutter bar.

FIGS. 7, 8 and 8A show the function of the linkage when operating off of the ground. The major portion of the header weight is supported by the float springs. The portion of the weight that is not supported by the float springs is supported by contact of the balance beam 34 with the down stop 41. This force is used to operate the balance link 40 to hold the cutterbar straight.

FIG. 8 shows the linkage in a position corresponding to a straight cutter bar. Balance link 40 and beam 34 are both in contact with the stop 41 and sharing the down load from the header that is not supported by the float spring. Force between beam 34 and stop 41 will reduce the force on rear tension link and tend to return cutterbar from concave up to straight position. Force between link 40 and stop 41 will be balanced by tension in the strap 42. The total of the force from the stop 41 and the link 40 and the force in the strap 42 will be balanced by a reaction at the pivot 43 on the balance beam 34. The reaction at the pivot 43 produces a clockwise moment about the pivot 34B and increases the tension in the rear tension link 33 tending to return the cutterbar from concave to straight. Thus the cutterbar is held in straight position by the two opposing forces.

FIG. 7 shows the linkage in a position with the cutterbar in a concave up position. The link 40 is not making contact with the strap 42 therefore there is no significant force on the link 40. The balance beam 34 is in contact with the down stop 41 and will tend to rotate the balance beam 34 counter clockwise and move the cutterbar from concave up to straight.

FIG. 8A shows the linkage in a position with the cutterbar in a concave down position. The balance beam 34 is not in contact with the down stop 41 therefore it is not providing additional force to hold cutterbar in concave down position. The balance beam 40 is in contact with down stop 41 and the strap 42 is in tension, therefore the force from the down stop 41 will tend to pull the wings up into a straight cutterbar position.

Figure 17:
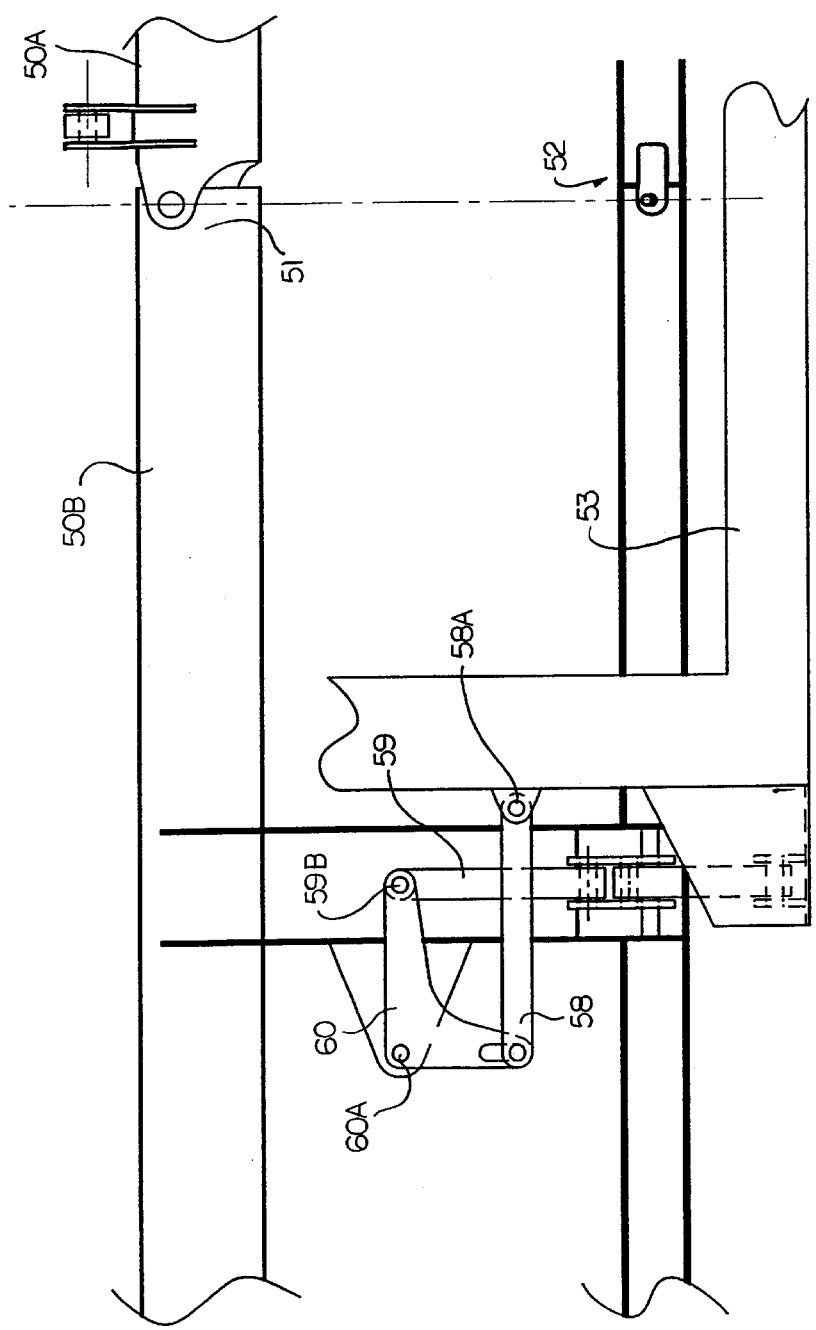
FIGS. 17 and 18 show an arrangement in which there are only two header sections pivotal at the center and shows the linkage between each section and the supporting adapter frame.
Figure 18:
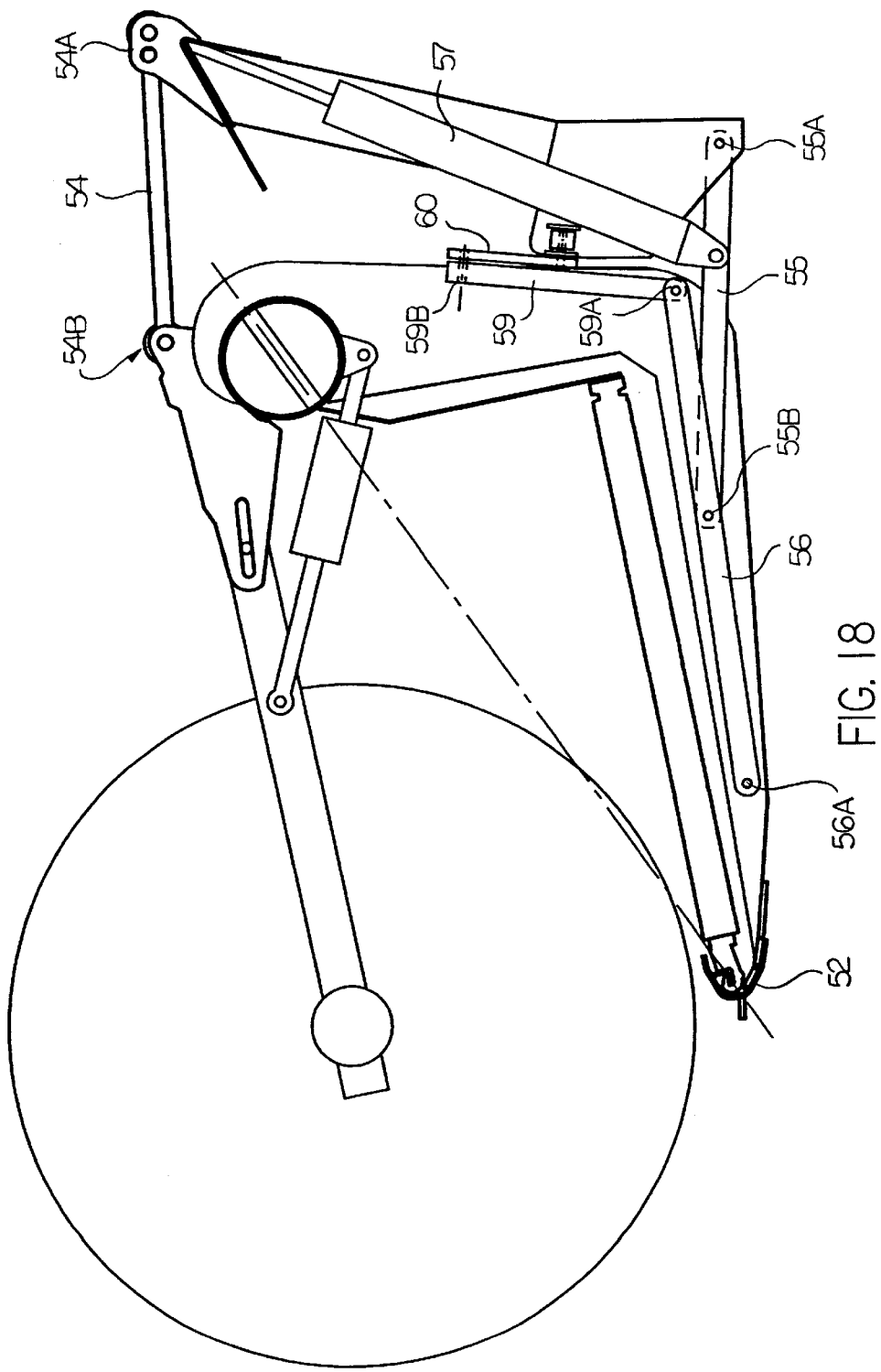

The above arrangement relates to the preferred construction in which there is provided a central section and only two wing sections. However it will be appreciated that the present invention and the concepts thereof can be applied to different numbers of sections. In the minimum number of sections shown in FIGS. 17 and 18, there is shown a construction where there are two sections with no center section so that the pivotal movement occurs about a center line of the header centrally of the adapter frame. In this arrangement there is provided a balance arm similar to that previously described to which the lifting force of the lower float link is applied. A bell crank communicates forces through a compressive link to the adapter frame thus balancing the forces between the left and right sections of the header.

There is a header section 50. It is divided into two sections left wing 50A and right wing 50B. They are connected with a hinge 51 at the main frame and a cutterbar hinge 52. There is an adapter 53 that is mounted on a combine and connected to the header by a top float link 54. This is connected to the adapter frame with a horizontal pivot 54A.

This can be free to pivot vertically but be designed to take side load. It is connected to the header frame close to the hinge area. This could be a ball joint 54B that would allow the header to float up but restrain it from moving to the side relative to the adapter frame.

A lower float link 55 is connected to each side of the adapter frame with pivot pin 55A The front of the link is connected to the balance beam 56 with a pivot pin 55B.

Pivots 55A and 55B allow free rotation about a horizontal axis and some lateral motion such as can be obtained from a rubber bushing. An upward force is provided by float spring 57. A linkage system is provided to communicate the vertical force from the front pivot 55B of lower float link 55 into a generally horizontal force in link 58. This horizontal force is supported by the adapter frame at pivot 58A. The reaction on the header frame tends to raise the wing and cause it to pivot about pivots 51 and 52. The linkage system shown consists of the balance beam 56 connected to header frame leg with a horizontal pivot pin at 56A. The lower float link exerts an generally upward force at pivot 55B. The connecting link 59 is connected to the balance link with a pivot at 59A. The top of link 59 is connected to a bell crank 60 at 59B. The bell crank 60 is pivoted on the inner header frame at pivot 60A. Force from the link 59 produces a torque about pivot 60A. This torque is balanced by a force in the link 58. The reaction from these two forces produces an upward and outward force at the pivot 60A that balances the wing of the header.

Suitable design of the linkage can result in the wing supported so that a uniform force is applied between the ground and the cutter bar. An adjustment can be provided so that the operator can adjust the balance of forces between the outer end of the cutter bar and the inner end of the cutterbar.

In a further alternative arrangement shown in FIG. 12, additional wing sections can be provided so that there are a center section C, an inner or first wing section I and an outer or second wing section O on each side. The arrangement for transferring the forces is shown in FIG. 13 which uses the same construction as previously described in relation to the first wing section including the balance beam 34 which communicates to the bell crank 32. In this arrangement there is provided a second balance beam 150 so that the tension link 31 from the bell crank 32 communicates forces to the balance beam 150 providing a lifting force at a pivot 151 on the first wing section and a lifting force through a tension link 152 to the second wing section. The balance beam 150 thus can be adjusted to provide a balancing of the forces between the center section, the first wing section and the second wing section using the principles as previously described.

Figure 14:
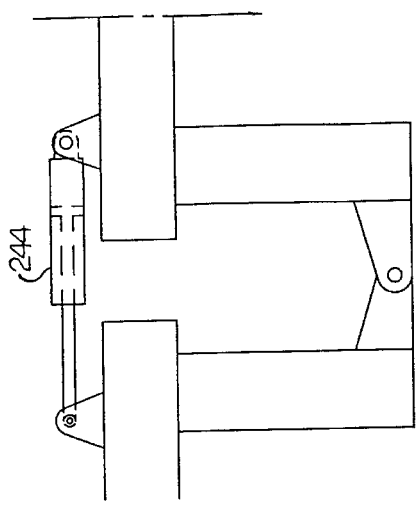
FIGS. 14, 15 and 16 show the components of an alternative arrangement in which the forces are balanced hydraulically using hydraulic cylinders.
Figure 15:
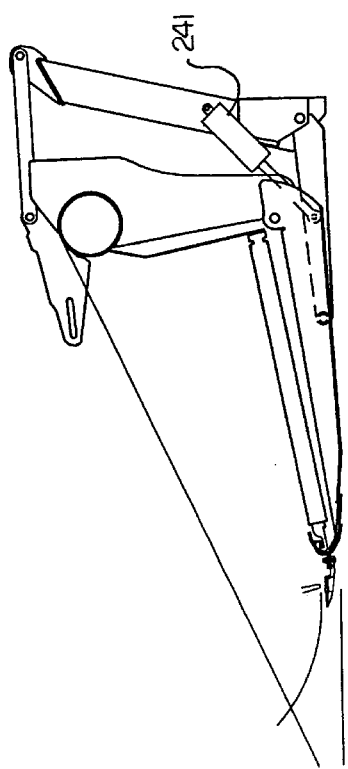

In FIGS. 14 and 15 is shown an alternative arrangement in which the mechanical linkages are replaced by hydraulic linkages. Thus the spring 24 is replaced by a hydraulic cylinder 241 which forms part of a float system circuit system generally indicated at 242. The float system circuit includes an accumulator 243 in a conventional manner. A second cylinder 244 is provided to support the wing section 10B relative to the center section 10B at a position above the pivot 27. Thus the cylinder 241 supports the center section together with the inboard weight of the wing section and the cylinder 244 supports the outboard weight of the wing section. The spring forces provided by these two cylinders in relation to the accumulator 243 can therefore be balanced automatically by the system so that when the total lifting force is changed by a float control valve 246, the lifting force to each of the wing section and the center section is proportionally balanced as previously described.

Figure 19:
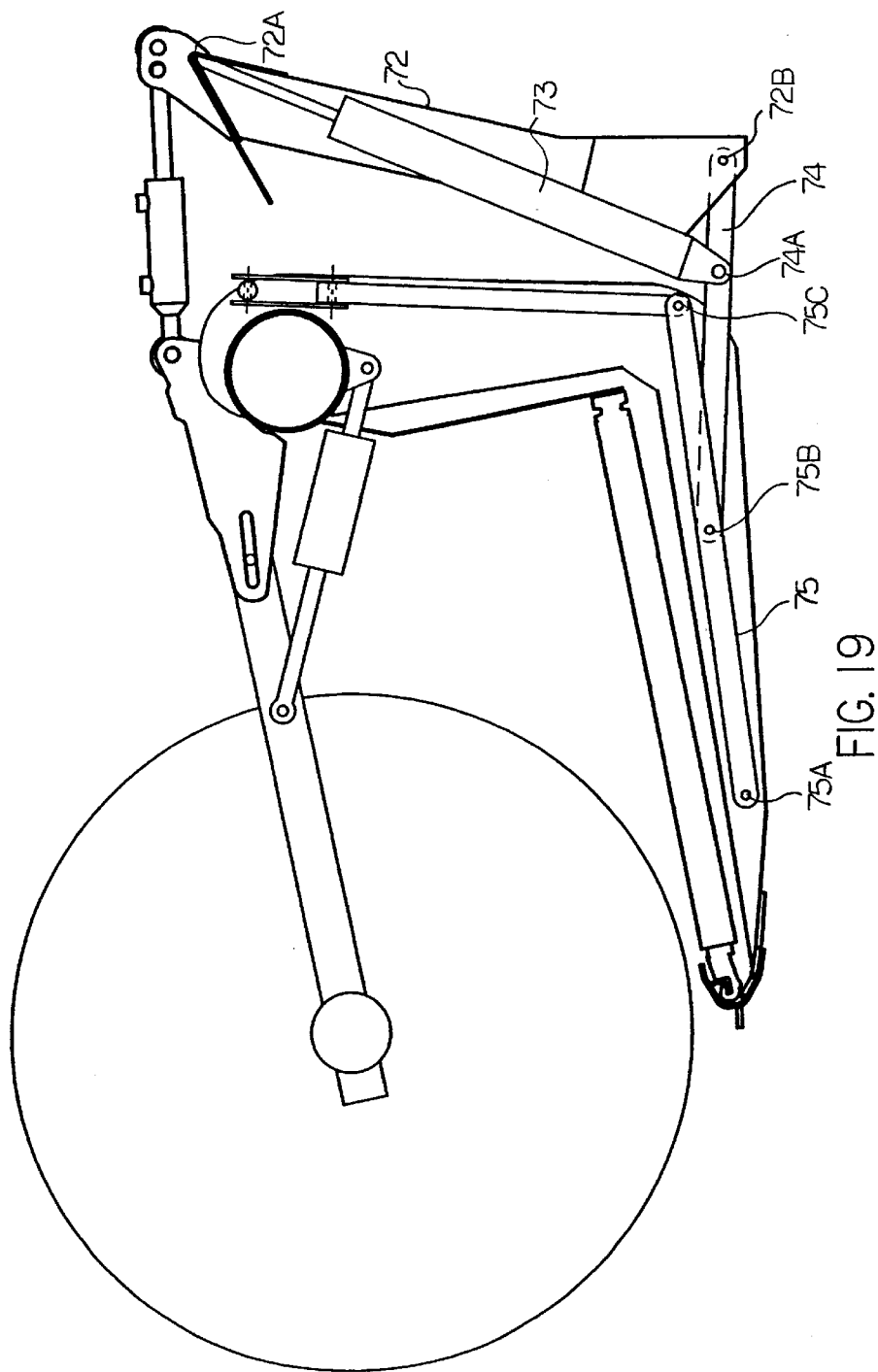

An alternate design is shown in FIGS. 19 and 20. FIG. 20 shows the rear view of the left portion of the center frame 70 and the right portion of the left wing 71. The adapter frame is not shown in FIG. 20. FIG. 19 is a cross section view of the balance linkage at section A—A shown on FIG. 20. The adapter frame 72 is normally supported by the combine feeder housing (not shown). The float spring 73 is anchored to the top of the adapter frame 72A. The lower support link 74 is pivoted at the lower portion of the adapter frame at 72B. The float spring is attached to the lower support link and applies an upward force at 74A. The balance link 75 is mounted to pivot at 75A on the lower frame. The forward end of the lower support link is attached to the balance link at 75B. The rear end of the balance link pivots on a compression link 76 at 75C. Thus the float spring 73 applies sufficient force on the lower link 74 to support the header through the balance link at 75B. The balance link supports the header by means of a vertical reaction at 75A and a vertical force from the rear compression link 76. Bell crank 77 is mounted to pivot on the center frame section at 77A. The vertical force from the compression link 76 is applied to the bell crank at 77B. The resulting torque is balanced by a tension force in an upper tension link 78 applied at a pin 78A. The wing 71 is pivoted at front pivot 71A and rear pivot 71B. The moment arm of the tension link 78 is adjusted by moving the pin 78A up or down in a slot 77C. Thus the force in the tension link 78 is varied to balance the moment of the wing about pivots 71A and 71B. This arrangement therefore operates using the principles set forth above with the tension link but uses a compression link 76 which may in some constructions be more mechanically sound. In order to do this the locations of the various components and the forces applied thereby on the balance beam 75 are changed relative to the embodiment of FIGS. 3 to 6.

Figure 16:
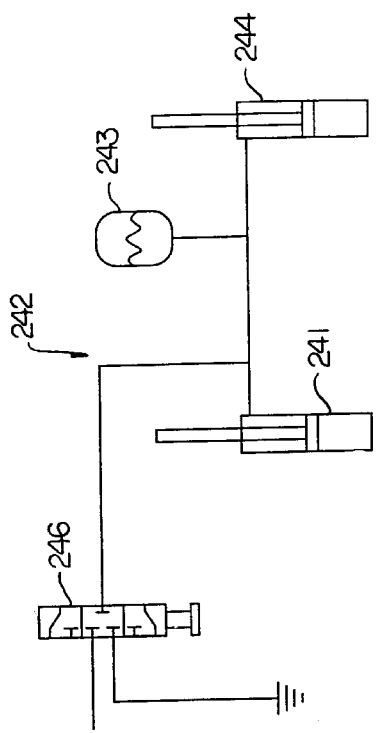

In a yet further arrangement similar to that shown in FIGS. 14, 15 and 16, at least one of the first and second lifting components, that is particularly the hydraulic cylinders is modified to include an actively driven control. Thus the cylinder 244 is actively controlled for adjusting the height of the outboard end of the second portion in response to the output of a sensor responsive to changes in lifting force from the ground at points along the cutter bar.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A crop harvesting header comprising:
   a main frame structure extending across a width of the header for movement in a forward direction generally at right angles to the width across ground including a crop to be harvested;
   a mounting assembly for carrying the main frame structure on a propulsion vehicle
   a crop receiving table carried on the main frame structure across the width of the header;
   a cutter bar across a front of the table arranged to move over the ground in a cutting action and carrying a cutter knife operable for cutting the crop as the header is moved forwardly across the ground for depositing the crop onto the table;
   a skid element extending across the width of the header for engaging the ground so as to receive lifting forces from the ground at whatever points of the skid element contact the ground tending to lift the cutter bar;
   a crop transport system on the table for moving the cut crop toward a discharge location of the header;
   the main frame structure being divided into a first frame portion and a second separate frame portion with the second connected to the first by a pivot coupling arranged for pivotal movement of the second relative to the first about a pivot axis extending in a plane parallel to the forward direction and intersecting the cutter bar so that, as the second pivots relative to the first, the cutter bar bends in the area adjacent the respective pivot axis to accommodate the pivotal movement;
   the pivot coupling of the second frame portion relative to the first frame portion being arranged such that weight from the second frame portion outboard of the pivot coupling tends to rotate the second frame portion about the pivot coupling in a downward direction;
   the mounting assembly including a support assembly arranged to provide a total lifting force from the propulsion vehicle acting to support the main frame structure for floating movement relative to the propulsion vehicle such that upward pressure from the ground on the skid element, which is greater than a downward force from a part of the weight of the header unsupported by the lifting force, tends to lift the main frame structure relative to the propulsion vehicle;
   the support assembly being arranged such that the total lifting force can be varied so that the total downward force, from that part of the weight of the header which is unsupported by the lifting force, can be varied to change the total pressure of the skid element on the ground;
   the support assembly including a first component arranged to provide a first lifting force for the first frame portion;
   the support assembly including a second component arranged to provide a second lifting force for the second frame portion;
   the support assembly being arranged to provide floating movement for each of the first and second frame portions relative to each other and relative to the propulsion vehicle such that upward pressure from the ground on the skid element, which is greater than a downward force from a part of the weight of the header unsupported by the lifting force, tends to lift each of the first and second frame portions relative to the propulsion vehicle;
   the first and second components being arranged such that the first and second lifting forces vary as the total lifting force is varied and such that the lifting force is balanced across the width of the first and second frame portions.

2. The header according to claim 1 wherein the first and second components are arranged such that the first and second lifting forces vary proportionally.

3. The header according to claim 1 wherein the first and second components include a balancing connection which is arranged such that adjustment of the support assembly to effect variation of the total lifting force automatically balances the first and second lifting forces proportionally.

4. The header according to claim 3 wherein the balancing connection comprises a pivotal balance beam to which is applied as three balanced forces a) said total lifting force from the propulsion vehicle, b) said first lifting force and c) said second lifting force.

5. The header according to claim 1 wherein the support assembly includes at least one spring which is arranged to provide spring floating movement of the first and second frame portions relative to the propulsion vehicle and relative to each other.

6. The header according to claim 1 wherein the second component comprises an interconnecting linkage which transfers the outboard weight of the second frame portion to the first frame portion.

7. The header according to claim 6 wherein the linkage includes a pivotal balance beam to which is applied as three balanced forces a) said lifting force from the propulsion vehicle, b) at least part of the weight from the first frame portion and said weight applied to the first frame portion from the second frame portion at the pivot coupling and c) said outboard weight of the second frame portion.

8. The header according to claim 7 wherein the balance beam is located at the first frame portion.

9. The header according to claim 7 wherein the balance beam extends in the forward direction.

10. The header according to claim 9 wherein the mounting assembly includes a lift arm extending in the forward direction parallel to and underneath the balance beam.

11. The header according to claim 10 wherein the lift arm is arranged to apply to the balance beam force a) at a position forwardly of force b) which is applied forwardly of force c).

12. The header according to claim 7 wherein the linkage includes a weight transfer link extending from the second frame portion to the first frame portion at a position above the pivot coupling.

13. The header according to claim 12 wherein the weight transfer link includes a bell crank on the first frame portion above the balance beam.

14. The header according to claim 13 wherein the bell crank is adjustable to balance the forces b) and c) to hold the cutter bar straight when the upward pressure from the ground is constant along the cutter bar.

15. The header according to claim 6 wherein the linkage is a non-spring linkage and the floating movement is provided by at least one spring of the support assembly.

16. The header according to claim 1 wherein the mounting assembly includes two lift arms each carried on a respective spring and spaced apart across the first portion such that the first portion can float upwardly and can twist about an axis in the forward direction.

17. The header according to claim 1 wherein each of the portions includes a horizontal main frame beam and wherein the pivot coupling between the second frame portion and the first frame portion is arranged below the main beams.

18. The header according to claim 1 wherein the pivotal movement between the second frame portion and the first frame portion is less than a total of 6 degrees.

19. The header according to claim 1 wherein the pivotal movement between the second frame portion and the first frame portion is less than a total of 4 degrees.

20. The header according to claim 1 wherein the header is unsupported by ground wheels such that all lifting forces from the ground are communicated through said skid element.

21. The header according to claim 1 wherein there is provided a bottom stop member arranged such that downward floating movement of the header is halted at a bottom position when the header is lifted to a raised position in which the skid element is spaced from the ground so that there is no lifting force from the ground and wherein there is provided a balance mechanism to balance the first and second portions in aligned position so the cutter bar is straight when the header is in the raised position.

22. The header according to claim 21 wherein the first and second components include a balancing connection which is arranged such that adjustment of the support assembly to effect variation of the total lifting force automatically balances the first and second lifting forces proportionally and wherein the balance mechanism is arranged to apply balance forces from the bottom stop member to the balancing connection.

23. The header according to claim 1 wherein the second component includes an interconnecting linkage which transfers the outboard weight of the second frame portion to the first frame portion having a spring, a spring force provided thereby being adjustable in response to the variation of the lifting force provided by the mounting assembly such that the downward force of the second frame portion varies separately as the total downward force is varied.

24. The header according to claim 23 wherein the first component includes a first hydraulic cylinder, the second component includes a second cylinder and the balancing connection comprises a hydraulic circuit connecting the first and second cylinders.

25. The header according to claim 1 wherein at least one of the first and second components includes an actively driven coupling for adjusting the height of the outboard end of the second portion and wherein there is provided a sensor responsive to changes in lifting force from the ground at points along the cutter bar for controlling the actively driven coupling.

26. A crop harvesting header comprising:
   a main frame structure extending across a width of the header for movement in a forward direction generally at right angles to the width across ground including a crop to be harvested;
   a mounting assembly for carrying the main frame structure on a propulsion vehicle;
   a crop receiving table carried on the main frame structure across the width of the header;
   a cutter bar across a front of the table arranged to move over the ground in a cutting action and carrying a cutter knife operable for cutting the crop as the header is moved forwardly across the ground for depositing the crop onto the table;
   a skid element extending across the width of the header for engaging the ground so as to receive lifting forces from the ground at whatever points of the skid element contact the ground tending to lift the cutter bar;
   a crop transport system on the table for moving the cut crop toward a discharge location of the header;
   the main frame structure being divided into a first frame portion and a second separate frame portion with the second connected to the first by a pivot coupling arranged for pivotal movement of the second relative to the first about a pivot axis extending in a plane parallel to the forward direction and intersecting the cutter bar so that, as the second pivots relative to the first, the cutter bar bends in the area adjacent the respective pivot axis to accommodate the pivotal movement;
   the pivot coupling of the second frame portion relative to the first frame portion being arranged such that weight from the second frame portion outboard of the pivot coupling tends to rotate the second frame portion about the pivot coupling in a downward direction;

the mounting assembly including a support assembly arranged to provide a total lifting force from the propulsion vehicle acting to support the main frame structure for floating movement relative to the propulsion vehicle;

the support assembly being arranged such that the lifting force can be varied;

the support assembly including a first component arranged to provide a first lifting force for the first frame portion;

the support assembly including a second component arranged to provide a second lifting force for the second frame portion;

wherein the support assembly includes a balancing connection between the first and second components which is arranged such that adjustment of the support assembly to effect variation of the total lifting force automatically balances the first and second lifting forces proportionally and such that the lifting force is balanced across the width of the first and second frame portions.

27. The header according to claim 26 wherein the balancing connection comprises a pivotal balance beam to which is applied as three balanced forces a) said total lifting force from the propulsion vehicle, b) said first lifting force and c) said second lifting force.

28. The header according to claim 26 wherein the support assembly includes at least one spring which is arranged to provide spring floating movement of the first and second frame portions relative to the propulsion vehicle and relative to each other.

29. The header according to claim 27 wherein the second component comprises an interconnecting linkage which transfers the outboard weight of the second frame portion to the first frame portion.

30. The header according to claim 29 wherein the linkage includes a weight transfer link extending from the second frame portion to the first frame portion at a position above the pivot coupling.

31. The header according to claim 30 wherein the weight transfer link includes a bell crank on the first frame portion above the balance beam.

32. The header according to claim 31 wherein the bell crank is adjustable to balance the forces b) and c) to hold the cutter bar straight when the upward pressure from the ground is constant along the cutter bar.

33. The header according to claim 27 wherein the balance beam is located at the first frame portion.

34. The header according to claim 27 wherein the balance beam extends in the forward direction.

35. The header according to claim 34 wherein the mounting assembly includes a lift arm extending in the forward direction parallel to and underneath the balance beam.

36. The header according to claim 35 wherein the lift arm is arranged to apply to the balance beam force a) at a position forwardly of force b) which is applied forwardly of force c).

37. A crop harvesting header comprising:

a main frame structure extending across a width of the header for movement in a forward direction generally at right angles to the width across ground including a crop to be harvested;

a mounting assembly for carrying the main frame structure on a propulsion vehicle;

a crop receiving table carried on the main frame structure across the width of the header;

a cutter bar across a front of the table arranged to move over the ground in a cutting action and carrying a cutter knife operable for cutting the crop as the header is moved forwardly across the ground for depositing the crop onto the table;

a skid element extending across the width of the header for engaging the ground so as to receive lifting forces from the ground at whatever points of the skid element contact the ground tending to lift the cutter bar;

a crop transport system on the table for moving the cut crop toward a discharge location of the header;

the main frame structure being divided into a first frame portion and a second separate frame portion with the second connected to the first by a pivot coupling arranged for pivotal movement of the second relative to the first about a pivot axis extending in a plane parallel to the forward direction and intersecting the cutter bar so that, as the second pivots relative to the first, the cutter bar bends in the area adjacent the respective pivot axis to accommodate the pivotal movement;

the pivot coupling of the second frame portion relative to the first frame portion being arranged such that weight from the second frame portion outboard of the pivot coupling tends to rotate the second frame portion about the pivot coupling in a downward direction;

the mounting assembly including at least a support assembly arranged to provide a lifting force from the propulsion vehicle acting to support the main frame structure for floating movement relative to the propulsion vehicle;

the support assembly being arranged such that the lifting force can be varied;

the support assembly including a first component arranged to provide a first lifting force for the first frame portion;

the support assembly including a second component arranged to provide a second lifting force for the second frame portion;

the support assembly being arranged to provide floating movement for each of the first and second frame portions relative to each other and relative to the propulsion vehicle;

wherein there is provided a bottom stop member arranged such that downward floating movement of the header is halted at a bottom position when the header is lifted to a raised position in which the skid element is spaced from the ground;

and wherein there is provided a balance mechanism to balance the first and second portions in aligned position so the cutter bar is straight when the header is in the raised position.

38. A crop harvesting header comprising:

a main frame structure extending across a width of the header for movement in a forward direction generally at right angles to the width across ground including a crop to be harvested;

a mounting assembly for carrying the main frame structure on a propulsion vehicle;

a crop receiving table carried on the main frame structure across the width of the header;

a cutter bar across a front of the table arranged to move over the ground in a cutting action and carrying a cutter knife operable for cutting the crop as the header is moved forwardly across the ground for depositing the crop onto the table;

a skid element extending across the width of the header for engaging the ground so as to receive lifting forces from the ground at whatever points of the skid element contact the ground tending to lift the cutter bar;

a crop transport system on the table for moving the cut crop toward a discharge location of the header;

the main frame structure including a center frame portion, a first wing frame portion and a second wing frame portion;

the first wing frame portion being connected to the center frame portion by a first pivot coupling arranged for pivotal movement of the first wing frame portion relative to the center frame portion about a first pivot axis extending in a plane parallel to the forward direction and intersecting the cutter bar so that, as the first wing frame portion pivots relative to the center frame portion, the cutter bar bends in the area adjacent the first pivot axis to accommodate the pivotal movement;

the first pivot coupling thus acting to support weight from the first wing frame portion at the pivot coupling while weight from the first wing frame portion outboard of the first pivot coupling tends to rotate the first wing frame portion about the first pivot coupling in a downward direction;

the second wing frame portion being connected to the center frame portion by a second pivot coupling arranged for pivotal movement of the second wing frame portion relative to the center frame portion about a second pivot axis extending in a plane parallel to the forward direction and intersecting the cutter bar so that, as the second wing frame portion pivots relative to the center frame portion, the cutter bar bends in the area adjacent the second pivot axis to accommodate the pivotal movement;

the second pivot coupling thus acting to support weight from the second wing frame portion at the second pivot coupling while weight from the second wing frame portion outboard of the second pivot coupling tends to rotate the second wing frame portion about the second pivot coupling in a downward direction;

the mounting assembly including a first and a second spring arranged at transversely spaced positions on the main frame structure;

the first and second springs providing a first and second spring lifting force respectively which together provide a total spring lifting force from the propulsion vehicle acting to support the main frame structure for floating movement relative to the propulsion vehicle such that upward pressure from the ground on the skid element, which is greater than a downward force from a part of the weight of the header unsupported by the lifting force, tends to lift the main frame structure relative to the propulsion vehicle;

the mounting assembly being arranged such that the total spring lifting force provided by the first and second springs can be varied so that the total downward force, from that part of the weight of the main frame structure which is unsupported by the total spring lifting force, can be varied to change the total pressure of the skid element on the ground;

the mounting assembly including a center support assembly which communicates from the total spring lifting force of the first and second springs a center lifting force against the weight of the center frame portion and weight from the first wing frame portion at the first pivot coupling and weight from the second wing frame portion at the second pivot coupling;

the mounting assembly including a first interconnecting linkage which communicates from the total spring lifting force a first lifting force against the outboard weight of the first wing frame portion;

the mounting assembly including a second interconnecting linkage which communicates from the total spring lifting force a second lifting force against the outboard weight of the second wing frame portion;

the center support assembly and first and second interconnecting linkages being arranged such that the center lifting force and the first and second lifting forces vary as the total spring lifting force is varied and such that the lifting force is balanced across the width of the center and wing frame portions.

39. The header according to claim 38 wherein the center support assembly and first and second interconnecting linkages are arranged such that the center lifting force and the first and second lifting forces vary proportionally.

40. The header according to claim 38 wherein the center support assembly and first and second interconnecting linkages include a balancing connection which is arranged such that adjustment of the mounting assembly to effect variation of the total spring lifting force automatically balances the center lifting force and the first and second lifting forces proportionally.

41. The header according to claim 38 wherein the first interconnecting linkage transfers the outboard weight of the first wing frame portion to the center frame portion and wherein the second interconnecting linkage transfers the outboard weight of the second wing frame portion to the center frame portion.

42. The header according to claim 38 wherein each of the first and second interconnecting linkage is a non-spring linkage and spring coupling of each is provided by a connection to a respective one of the first and second springs of the mounting assembly such that the floating movement is provided at least partly by said first and second springs.

43. The header according to claim 38 wherein the center support assembly and the first interconnecting linkage include a first balance beam to which is applied as three balanced forces a) said first spring lifting force from the first spring, b) a part of the center lifting force and c) said first lifting force and wherein the center support assembly and the second interconnecting linkage include a second balance beam to which is applied as three balanced forces a) said second spring lifting force from the second spring, b) a part of the center lifting force and c) said second lifting force.

44. The header according to claim 43 wherein the first and second balance beams are located at the center frame portion.

45. The header according to claim 43 wherein the first and second balance beams extend in the forward direction.

46. The header according to claim 45 wherein the first spring of the mounting assembly includes a first lift arm extending in the forward direction parallel to and underneath the first balance beam and wherein the second spring of the mounting assembly includes a second lift arm extending in the forward direction parallel to and underneath the second balance beam.

47. The header according to claim 46 wherein the first lift arm is arranged to apply to the first balance beam force a) at a position forwardly of force b) which is applied forwardly of force c) and wherein the second lift arm is arranged to apply to the second balance beam force a) at a position forwardly of force b) which is applied forwardly of force c).

48. The header according to claim 43 wherein the first interconnecting linkage includes a first weight transfer link extending from the first wing frame portion to the center frame portion at a position above the first pivot coupling and arranged to connect to the first balance beam to apply said force c) thereto in an upward direction and wherein the second interconnecting linkage includes a second weight transfer link extending from the second wing frame portion to the center frame portion at a position above the second pivot coupling and arranged to connect to the second balance beam to apply said force c) thereto in an upward direction.

49. The header according to claim 48 wherein the first weight transfer link includes a first bell crank on the center frame portion above the first balance beam and wherein the second weight transfer link includes a second bell crank on the center frame portion above the second balance beam.

50. The header according to claim 49 wherein each of the first and second bell cranks is independently adjustable to balance the forces b) and c) to hold the cutter bar straight when the upward pressure from the ground is constant along the cutter bar.

51. The header according to claim 38 wherein each of the center frame portion and the first and second wing frame portions includes a horizontal main frame beam and wherein the first and second pivot couplings are arranged below the main beams.

52. The header according to claim 38 wherein the pivotal movement between the first wing frame portion and the center frame portion is less than a total of 6 degrees and wherein the pivotal movement between the second wing frame portion and the center frame portion is less than a total of 6 degrees.

53. The header according to claim 38 wherein the pivotal movement between the first wing frame portion and the center frame portion is less than a total of 4 degrees and wherein the pivotal movement between the second wing frame portion and the center frame portion is less than a total of 4 degrees.

54. The header according to claim 38 wherein the center frame portion and the first and second wing frame portions are unsupported by ground wheels such that all lifting forces from the ground are communicated through said skid element.

55. The header according to claim 38 wherein the mounting assembly includes a bottom stop member arranged such that downward floating movement of the center frame portion is halted at a bottom position when the header is lifted to a raised position in which the skid element is spaced from the ground so that there is no lifting force from the ground, wherein there is provided a first balance mechanism to balance the first wing frame portion in aligned position relative to the center frame portion and a second balance mechanism to balance the second wing frame portion in aligned position relative to the center frame portion so the cutter bar is straight when the header is in the raised position.

56. The header according to claim 55 wherein:
the first interconnecting linkage includes a first pivotal balance beam to which is applied as three balanced forces a) said lifting force from the first spring, b) part of the weight from the center frame portion and said weight applied to the center frame portion from the first wing frame portion at the first pivot coupling and c) said outboard weight of the first wing frame portion;
the second interconnecting linkage includes a second pivotal balance beam to which is applied as three balanced forces a) said lifting force from the second spring, b) part of the weight from the center frame portion and said weight applied to the center frame portion from the second wing frame portion at the second pivot coupling and c) said outboard weight of the second wing frame portion
and wherein each of the first and second balance mechanisms is arranged to apply balance forces from the bottom stop member to the first and second balance beams respectively.

57. The header according to claim 38 wherein the first interconnecting linkage which transfers the outboard weight of the first wing frame portion to the center frame portion includes a first wing spring, a spring force provided thereby being adjustable in response to the variation of the lifting force provided by the mounting assembly such that the downward force of the first wing frame portion varies separately as the total downward force is varied and wherein the second interconnecting linkage which transfers the outboard weight of the second wing frame portion to the center frame portion includes a second wing spring, a spring force provided thereby being adjustable in response to the variation of the lifting force provided by the mounting assembly such that the downward force of the second wing frame portion varies separately as the total downward force is varied.

58. The header according to claim 38 wherein the first interconnecting linkage which transfers the outboard weight of the first wing frame portion to the center frame portion includes a first actively driven coupling for adjusting the height of the outboard end of the first wing frame portion and there is provided a first sensor responsive to changes in lifting force from the ground at points along the cutter bar for controlling the first actively driven coupling and wherein the second interconnecting linkage which transfers the outboard weight of the second wing frame portion to the center frame portion includes a second actively driven coupling for adjusting the height of the outboard end of the second wing frame portion and there is provided a second sensor responsive to changes in lifting force from the ground at points along the cutter bar for controlling the second actively driven coupling.

59. The header according to claim 38 wherein:
the main frame structure includes a first outer wing frame portion and a second outer wing frame portion;
the first outer wing frame portion being connected to the first wing frame portion by a third pivot coupling arranged for pivotal movement of the first outer wing frame portion relative to the first wing frame portion about a third pivot axis extending in a plane parallel to the forward direction and intersecting the cutter bar so that, as the first outer wing frame portion pivots relative to the first wing frame portion, the cutter bar bends in the area adjacent the third pivot axis to accommodate the pivotal movement;
the third pivot coupling thus acting to support weight from the first outer wing frame portion at the third pivot coupling while weight from the first outer wing frame portion outboard of the third pivot coupling tends to rotate the first outer wing frame portion about the third pivot coupling in a downward direction;
the second outer wing frame portion being connected to the second wing frame portion by a fourth pivot coupling arranged for pivotal movement of the second outer wing frame portion relative to the second wing frame portion about a fourth pivot axis extending in a plane parallel to the forward direction and intersecting the cutter bar so that, as the second outer wing frame portion pivots relative to the second wing frame portion, the cutter bar bends in the area adjacent the fourth pivot axis to accommodate the pivotal movement;

the fourth pivot coupling thus acting to support weight from the second outer wing frame portion at the fourth pivot coupling while weight from the second outer wing frame portion outboard of the fourth pivot coupling tends to rotate the second outer wing frame portion about the fourth pivot coupling in a downward direction;

the first outer wing frame portion being connected to the first wing frame portion by a third interconnecting linkage which transfers the outboard weight of the first outer wing frame portion to the first wing frame portion, the third interconnecting linkage being arranged such that the downward force of the first outer wing frame portion varies separately as the total downward force is varied; and the second outer wing frame portion being connected to the second wing frame portion by a fourth interconnecting linkage which transfers the outboard weight of the second outer wing frame portion to the second wing frame portion, the fourth interconnecting linkage being arranged such that the downward force of the second outer wing frame portion varies separately as the total downward force is varied.

60. A crop harvesting header comprising:

a main frame structure extending across a width of the header for movement in a forward direction generally at right angles to the width across ground including a crop to be harvested;

a mounting assembly for carrying the main frame structure on a propulsion vehicle;

a crop receiving table carried on the main frame structure across the width of the header;

a cutter bar across a front of the table arranged to move over the ground in a cutting action and carrying a cutter knife operable for cutting the crop as the header is moved forwardly across the ground for depositing the crop onto the table;

a skid element extending across the width of the header for engaging the ground so as to receive lifting forces from the ground at whatever points of the skid element contact the ground tending to lift the cutter bar;

a crop transport system on the table for moving the cut crop toward a discharge location of the header;

the main frame structure including a center frame portion, a first wing frame portion and a second wing frame portion;

the first wing frame portion being connected to the center frame portion by a first pivot coupling arranged for pivotal movement of the first wing frame portion relative to the center frame portion about a first pivot axis extending in a plane parallel to the forward direction and intersecting the cutter bar so that, as the first wing frame portion pivots relative to the center frame portion, the cutter bar bends in the area adjacent the first pivot axis to accommodate the pivotal movement;

the first pivot coupling thus acting to support weight from the first wing frame portion at the pivot coupling while weight from the first wing frame portion outboard of the first pivot coupling tends to rotate the first wing frame portion about the first pivot coupling in a downward direction;

the second wing frame portion being connected to the center frame portion by a second pivot coupling arranged for pivotal movement of the second wing frame portion relative to the center frame portion about a second pivot axis extending in a plane parallel to the forward direction and intersecting the cutter bar so that, as the second wing frame portion pivots relative to the center frame portion, the cutter bar bends in the area adjacent the second pivot axis to accommodate the pivotal movement;

the second pivot coupling thus acting to support weight from the second wing frame portion at the second pivot coupling while weight from the second wing frame portion outboard of the second pivot coupling tends to rotate the second wing frame portion about the second pivot coupling in a downward direction;

the mounting assembly including a first and a second spring arranged at transversely spaced positions on the center frame portion to provide a lifting force from the propulsion vehicle acting to support the center frame portion for floating movement relative to the propulsion vehicle;

the mounting assembly being arranged such that the lifting force provided by the springs can be varied;

the first wing frame portion being connected to the center frame portion by a first interconnecting linkage which transfers the outboard weight of the first wing frame portion to the center frame portion;

the second wing frame portion being connected to the center frame portion by a second interconnecting linkage which transfers the outboard weight of the second wing frame portion to the center frame portion;

the first interconnecting linkage including a first balancing connection which is arranged automatically to balance the outboard weight of the first wing frame portion with the part of the weight from the center frame portion and said weight applied to the center frame portion from the first wing frame portion relative to the lifting force provided by the first spring as the lifting force is varied;

the second interconnecting linkage including a second balancing connection which is arranged automatically to balance the outboard weight of the second wing frame portion with the part of the weight from the center frame portion and said weight applied to the center frame portion from the second wing frame portion relative to the lifting force provided by the second spring as the lifting force is varied;

the first and second balancing connections being arranged such that the lifting force is balanced across the width of the center and wing frame portions.

61. The header according to claim 60 wherein the first balancing connection includes a first pivotal balance beam to which is applied as three balanced forces a) said lifting force from the first spring, b) part of the weight from the center frame portion and said weight applied to the center frame portion from the first wing frame portion at the first pivot coupling and c) said outboard weight of the first wing frame portion;

and the second balancing connection includes a second pivotal balance beam to which is applied as three balanced forces a) said lifting force from the second spring, b) part of the weight from the center frame portion and said weight applied to the center frame portion from the second wing frame portion at the second pivot coupling and c) said outboard weight of the second wing frame portion.

62. The header according to claim 61 wherein the first and second balance beams are located at the center frame portion.

63. The header according to claim 61 wherein the first and second balance beams extend in the forward direction.

64. The header according to claim 63 wherein the first spring of the mounting assembly includes a first lift arm extending in the forward direction parallel to and underneath the first balance beam and wherein the second spring of the mounting assembly includes a second lift arm extending in the forward direction parallel to and underneath the second balance beam.

65. The header according to claim 64 wherein the first lift arm is arranged to apply to the first balance beam force a) at a position forwardly of force b) which is applied forwardly of force c) and wherein the second lift arm is arranged to apply to the second balance beam force a) at a position forwardly of force b) which is applied forwardly of force c).

66. The header according to claim 60 wherein the first interconnecting linkage includes a first tension link extending from the first wing frame portion to the center frame portion at a position above the first pivot coupling and arranged to connect to the first balance beam to apply said force c) thereto in an upward direction and wherein the second interconnecting linkage includes a second tension link extending from the second wing frame portion to the center frame portion at a position above the second pivot coupling and arranged to connect to the second balance beam to apply said force c) thereto in an upward direction.

67. The header according to claim 66 wherein the first tension link includes a first bell crank on the center frame portion above the first balance beam and wherein the second tension link includes a second bell crank on the center frame portion above the second balance beam.

68. The header according to claim 67 wherein each of the first and second bell crank is independently adjustable to balance the forces b) and c) to hold the cutter bar straight when the upward pressure from the ground is constant along the cutter bar.

69. A crop harvesting header comprising:
- a main frame structure extending across a width of the header for movement in a forward direction generally at right angles to the width across ground including a crop to be harvested;
- a mounting assembly for carrying the main frame structure on a propulsion vehicle;
- a crop receiving table carried on the main frame structure across the width of the header;
- a cutter bar across a front of the table arranged to move over the ground in a cutting action and carrying a cutter knife operable for cutting the crop as the header is moved forwardly across the ground for depositing the crop onto the table;
- a skid element extending across the width of the header for engaging the ground so as to receive lifting forces from the ground at whatever points of the skid element contact the ground tending to lift the cutter bar;
- a crop transport system on the table for moving the cut crop toward a discharge location of the header;
- the main frame structure including a center frame portion, a first wing frame portion and a second wing frame portion;
- the first wing frame portion being connected to the center frame portion by a first pivot coupling arranged for pivotal movement of the first wing frame portion relative to the center frame portion about a first pivot axis extending in a plane parallel to the forward direction and intersecting the cutter bar so that, as the first wing frame portion pivots relative to the center frame portion, the cutter bar bends in the area adjacent the first pivot axis to accommodate the pivotal movement;
- the first pivot coupling thus acting to support weight from the first wing frame portion at the pivot coupling while weight from the first wing frame portion outboard of the first pivot coupling tends to rotate the first wing frame portion about the first pivot coupling in a downward direction;
- the second wing frame portion being connected to the center frame portion by a second pivot coupling arranged for pivotal movement of the second wing frame portion relative to the center frame portion about a second pivot axis extending in a plane parallel to the forward direction and intersecting the cutter bar so that, as the second wing frame portion pivots relative to the center frame portion, the cutter bar bends in the area adjacent the second pivot axis to accommodate the pivotal movement;
- the second pivot coupling thus acting to support weight from the second wing frame portion at the second pivot coupling while weight from the second wing frame portion outboard of the second pivot coupling tends to rotate the second wing frame portion about the second pivot coupling in a downward direction;
- the mounting assembly including a first and a second spring arranged at transversely spaced positions on the center frame portion to provide a lifting force from the propulsion vehicle acting to support the center frame portion for floating movement relative to the propulsion vehicle;
- the mounting assembly being arranged such that the lifting force provided by the springs can be varied;
- the first wing frame portion being connected to the center frame portion by a first interconnecting linkage which transfers the outboard weight of the first wing frame portion to the center frame portion;
- the second wing frame portion being connected to the center frame portion by a second interconnecting linkage which transfers the outboard weight of the second wing frame portion to the center frame portion;
- wherein there is provided a bottom stop member arranged such that downward floating movement of the header is halted at a bottom position when the header is lifted to a raised position in which the skid element is spaced from the ground;
- and wherein there is provided a first balance mechanism to balance the first wing frame portion in aligned position relative to the center frame portion and a second balance mechanism to balance the second wing frame portion in aligned position relative to the center frame portion so the cutter bar is straight when the header is in the raised position.

* * * * *